(12) United States Patent
Fontecchio et al.

(10) Patent No.: US 10,941,682 B2
(45) Date of Patent: *Mar. 9, 2021

(54) OIL FILTER SYSTEMS

(71) Applicant: Transportation IP Holdings, LLC, Norwalk, CT (US)

(72) Inventors: Paul John Fontecchio, Erie, PA (US); Gregory Alan Marsh, Erie, PA (US); Mark Thomas Zysk, Erie, PA (US); Paul James Wadding, Union City, PA (US); Michael Edward Keverline, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,333

(22) Filed: Oct. 28, 2019

(65) Prior Publication Data
US 2020/0063616 A1 Feb. 27, 2020

Related U.S. Application Data

(60) Division of application No. 15/687,794, filed on Aug. 28, 2017, now Pat. No. 10,494,965, which is a continuation of application No. 14/957,581, filed on Dec. 2, 2015, now Pat. No. 9,745,876, and a continuation-in-part of application No. 13/852,250, filed on Mar. 28, 2013, now Pat. No. 9,550,137.

(60) Provisional application No. 62/088,758, filed on Dec. 8, 2014.

(51) Int. Cl.
*F01M 11/03* (2006.01)
*B01D 35/00* (2006.01)
*B01D 35/30* (2006.01)
*B01D 29/15* (2006.01)
*B01D 29/52* (2006.01)
*B01D 29/54* (2006.01)

(52) U.S. Cl.
CPC ............. *F01M 11/03* (2013.01); *B01D 29/15* (2013.01); *B01D 29/52* (2013.01); *B01D 29/54* (2013.01); *B01D 35/005* (2013.01); *B01D 35/30* (2013.01); *B01D 2201/184* (2013.01); *B01D 2201/30* (2013.01); *B01D 2201/34* (2013.01); *F01M 2011/031* (2013.01)

(58) Field of Classification Search
CPC ............................. B01D 35/30; B01D 35/306
USPC ........................ 123/196 A; 210/450, 323.1
See application file for complete search history.

(56) References Cited

U.S. PATENT DOCUMENTS

| | | | |
|---|---|---|---|
| 4,052,307 A | 10/1977 | Humbert, Jr. | |
| 5,343,906 A | 9/1994 | Tibbals, III | |
| 5,621,166 A | 4/1997 | Butler | |
| 5,737,215 A | 4/1998 | Schricker et al. | |
| 6,334,950 B1 * | 1/2002 | Bogacki | B01D 29/58 210/97 |
| D757,212 S | 5/2016 | Fontecchio et al. | |
| 9,550,137 B2 * | 1/2017 | Fontecchio | B01D 29/114 |

(Continued)

*Primary Examiner* — Long T Tran
*Assistant Examiner* — James J Kim
(74) *Attorney, Agent, or Firm* — McCoy Russell LLP

(57) ABSTRACT

Various methods and systems are provided for an oil filter system for a vehicle system. In one example, an oil filter system comprises a housing within which a plurality of oil filter elements are disposed and a frame supporting the housing, the frame including one or more mountings configured to support one or more vehicle sub-assemblies.

12 Claims, 25 Drawing Sheets

(56) References Cited

U.S. PATENT DOCUMENTS

| | | | |
|---|---|---|---|
| 9,745,876 B2* | 8/2017 | Fontecchio | F01M 1/10 |
| 10,494,965 B2* | 12/2019 | Fontecchio | B01D 35/30 |
| 2007/0045173 A1* | 3/2007 | Zimmerman | B01D 29/52 |
| | | | 210/450 |
| 2016/0024982 A1* | 1/2016 | Fukutomi | B01D 39/2068 |
| | | | 123/196 A |

* cited by examiner

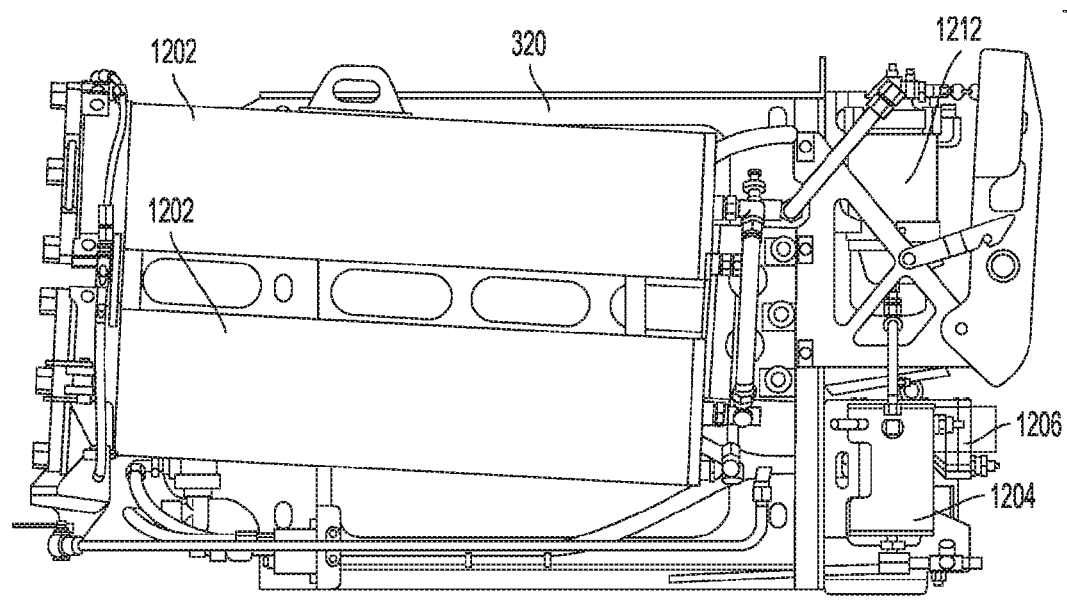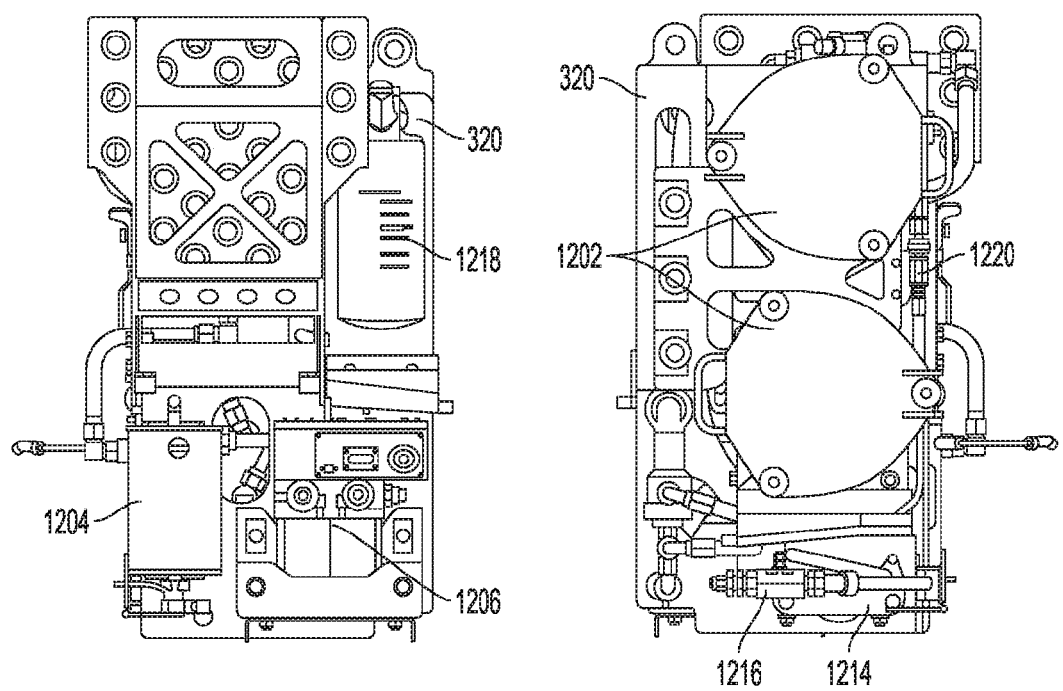
FIG. 15

OIL FILTER SYSTEMS

CROSS-REFERENCE TO RELATED APPLICATIONS

The present application is a divisional of U.S. Non-Provisional patent application Ser. No. 15/687,794, entitled "OIL FILTER SYSTEMS", and filed on Aug. 28, 2017. U.S. Non-Provisional patent application Ser. No. 15/687,794 is a continuation of U.S. patent application Ser. No. 14/957,581, filed Dec. 2, 2015, now U.S. Pat. No. 9,745,876. U.S. patent application Ser. No. 14/957,581 claims priority to U.S. Provisional patent application Ser. No. 62/088,758, filed Dec. 8, 2014. U.S. patent application Ser. No. 14/957,581 is also a continuation-in-part of U.S. patent application Ser. No. 13/852,250, filed on Mar. 28, 2013, now U.S. Pat. No. 9,550,137 The entire contents of each of the above-listed applications are hereby incorporated by reference for all purposes.

FIELD

Embodiments of the subject matter disclosed herein relate to oil filters and oil filter systems for vehicles and vehicle fleets.

BACKGROUND

Oil filters are used in engine systems to remove contaminants from engine oil before the oil enters the engine. Oil filter elements are mounted within the oil filter and are made up of porous media. As oil passes through the oil filter elements in the oil filter, contaminants become entrained in the filter while clean oil passes through the pores and exits the filter to enter the engine. Such oil filters may be contained within a vehicle system, and thus may include a support frame for mounting the oil filter to the vehicle system. The vehicle system may also include various sub-assemblies, such as fuel sub-assemblies, that are also mounted via a support frame. The inclusion of multiple vehicle sub-assemblies each supported by separate support frames may increase the cost and weight of the vehicle.

BRIEF DESCRIPTION

In one embodiment, an oil filter system comprises a housing and a frame. The housing includes a hollow cylinder having a convex curvature and which is configured to receive a plurality of oil filter elements disposed therein. The frame supports the housing and includes a first set of support arms and a second set of support arms, each support arm having a first, straight side facing away from the housing and a second, curved side having a concave curvature in one or more regions that contact the convex curvature of the housing. The straight side of each support arm of the first set of support arms are located in the same first plane, and the straight side of each support arm of the second set of support arms are located in the same second plane, each straight side of each support arm further including one or more mountings configured to support one or more vehicle sub-assemblies.

In one embodiment, an oil filter comprises an oil filter element adapted to be fittable over an outwardly projecting step of a first oil filter mount and fittable on a second oil filter mount without an outwardly projecting step, the oil filter element having an opening adapted to sealably engage with a base of the first oil filter mount and a base of the second oil filter mount.

In one example, the oil filter element may be a first oil filter element comprising porous media with a pore size adapted for use in a vehicle with a first rated emissions level. In this way, the first oil filter element may be fittable to a first oil filter mount and a second oil filter mount. However, a second oil filter element adapted for use in a vehicle with a higher, second rated emissions level may only be fittable to the second oil filter mount.

BRIEF DESCRIPTION OF THE DRAWINGS

The invention will be better understood from reading the following description of non-limiting embodiments, with reference to the attached drawings, wherein below:

FIGS. 12-18 show the oil filter and frame of FIGS. 1-11 in combination with a fuel sub-assembly and an oil cooler sub-assembly.

DETAILED DESCRIPTION

Embodiments of the subject matter disclosed herein relate to an oil filter system for an engine system. The oil filter system may include a housing which is configured to receive a plurality of filter elements therein, e.g., the plurality of filter elements are disposed in the housing for operation of the engine system, but may be removed for servicing, replacement, or before the engine system is first put into service. The filter elements may trap particles within engine oil, removing the particles before the engine oil is sent to the engine. The housing may be supported by a frame. The frame may be configured to couple the oil filter to a desired vehicle structure as well as prevent the oil filter from experiencing a high level of movement or vibrations. Further, the frame may also be configured to support one or more vehicle sub-assemblies, such as fuel sub-assembly (including, for example, fuel filters, fuel pump, fuel-water separator, etc.) and an oil cooler sub-assembly. In this way, a common frame may be used to support not only the oil filter, but also the fuel sub-assembly and the oil cooler sub-assembly, eliminating the need for multiple, separate support frames and reducing the weight of the entire oil filter, frame, fuel, and oil cooler assembly.

An example of a vehicle system in which the oil filter and frame described above may be installed is illustrated in FIG. 1. FIGS. 2-11 illustrate the oil filter and frame. FIGS. 12-18 illustrate the oil filter, frame, and associated vehicle sub-assemblies. FIGS. 4-11 are drawn to scale, although other relative dimensions may be used, if desired or as suggested herein.

The approach described herein may be employed in a variety of engine types, and a variety of engine-driven systems selected with reference to application specific criteria. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive may be used as an example of a mobile platform supporting a system incorporating an embodiment of the invention.

Figure 1:
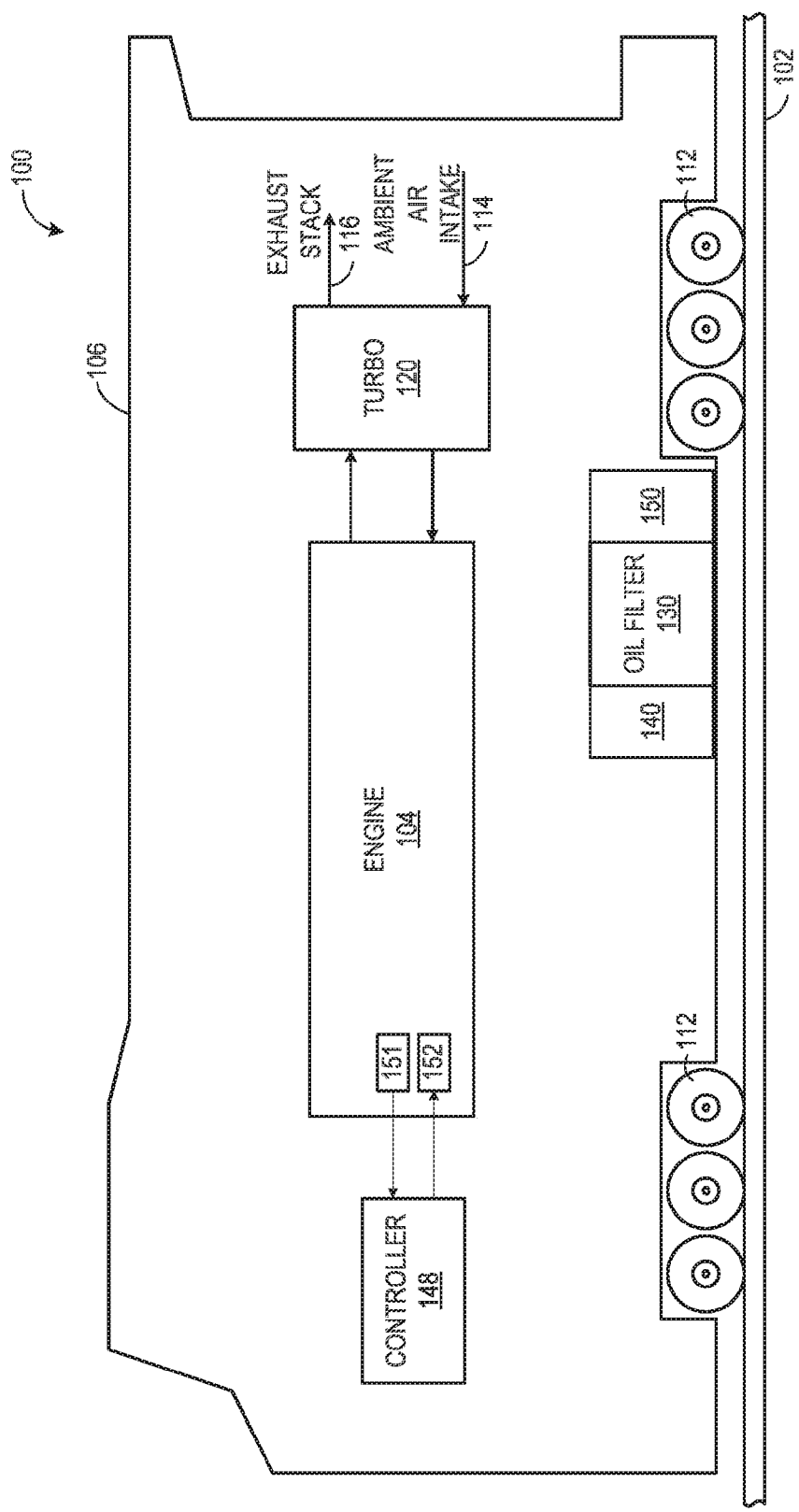
FIG. 1 shows a schematic diagram of a vehicle with an oil filter according to an embodiment of the disclosure.

Before further discussion of the oil filter housing embodiments, a positioning of an oil filter in an engine system is shown. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104 supported by an engine block (not shown).

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system may include a turbocharger 120 ("TURBO") that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages, e.g., the engine system may include high and low pressure turbochargers disposed in series with respect to the engine exhaust and air intake.

In some embodiments, the engine system may include an exhaust gas treatment system coupled in the exhaust passage upstream or downstream of the turbocharger. In on example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, $NO_x$ trap, as well as filters or other systems and devices.

Engine oil may be used to lubricate various engine components within the engine, such as pistons, bearings which allow rotation of a crankshaft and camshaft, or the like. Before oil is routed to the various engine components, the engine oil may first pass through an oil filter to remove contaminants such as dirt, carbon, and metallic particles. In this way, engine degradation from abrasive wear between particles and engine components may be reduced.

Engine oil may flow from the engine to an oil inlet of an oil filter 130. The engine oil then flows through the inside of the oil filter where contaminants may be filtered from the engine oil. After passing through the oil filter, filtered engine oil exits at an oil outlet of the oil filter and flows back into the engine where the oil may be used again by the engine components.

The oil filter may comprise an oil filter housing and one or more oil filter elements within the oil filter housing (not shown in FIG. 1). The oil filter may include an engine support skid frame integrated with the housing of the oil filter. The frame may be used to couple the oil filter to a desired vehicle system structure. Further, the frame may support and provide coupling to a fuel sub-assembly 140 and oil cooler sub-assembly 150. Further description of the oil filter housing and frame is presented below with regard to FIGS. 2-18. The oil filter, frame, and associated sub-assemblies (referred to collectively as the oil filter assembly) may be coupled in the vehicle in a space separate from the engine. In one embodiment, the oil filter assembly may be located on the floor of the vehicle, for example via coupling to the vehicle frame. In embodiments, the frame of the oil filter system may be separate from the engine block and separate from the vehicle frame.

A controller 148 may be employed to control various components related to the vehicle system. In one embodiment, the controller includes a computer control system. The controller further includes computer readable storage media (not shown) including code for enabling on-board monitoring and control of vehicle operation. The controller, while overseeing control and management of the vehicle system, may receive signals from a variety of sensors 151, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

Figure 2:
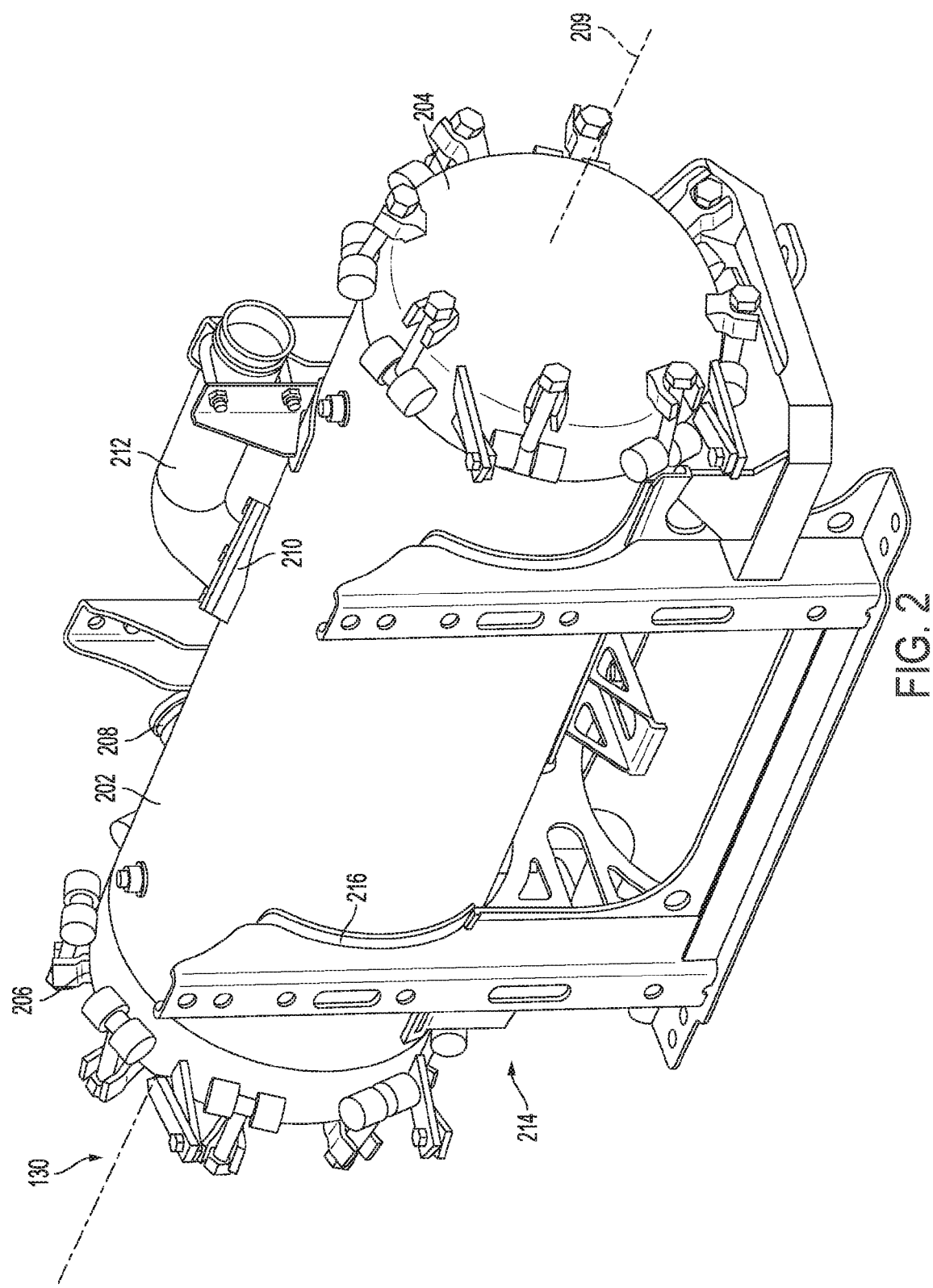
FIGS. 2-11 show the oil filter of FIG. 1 in combination with a support frame.
Figure 3:
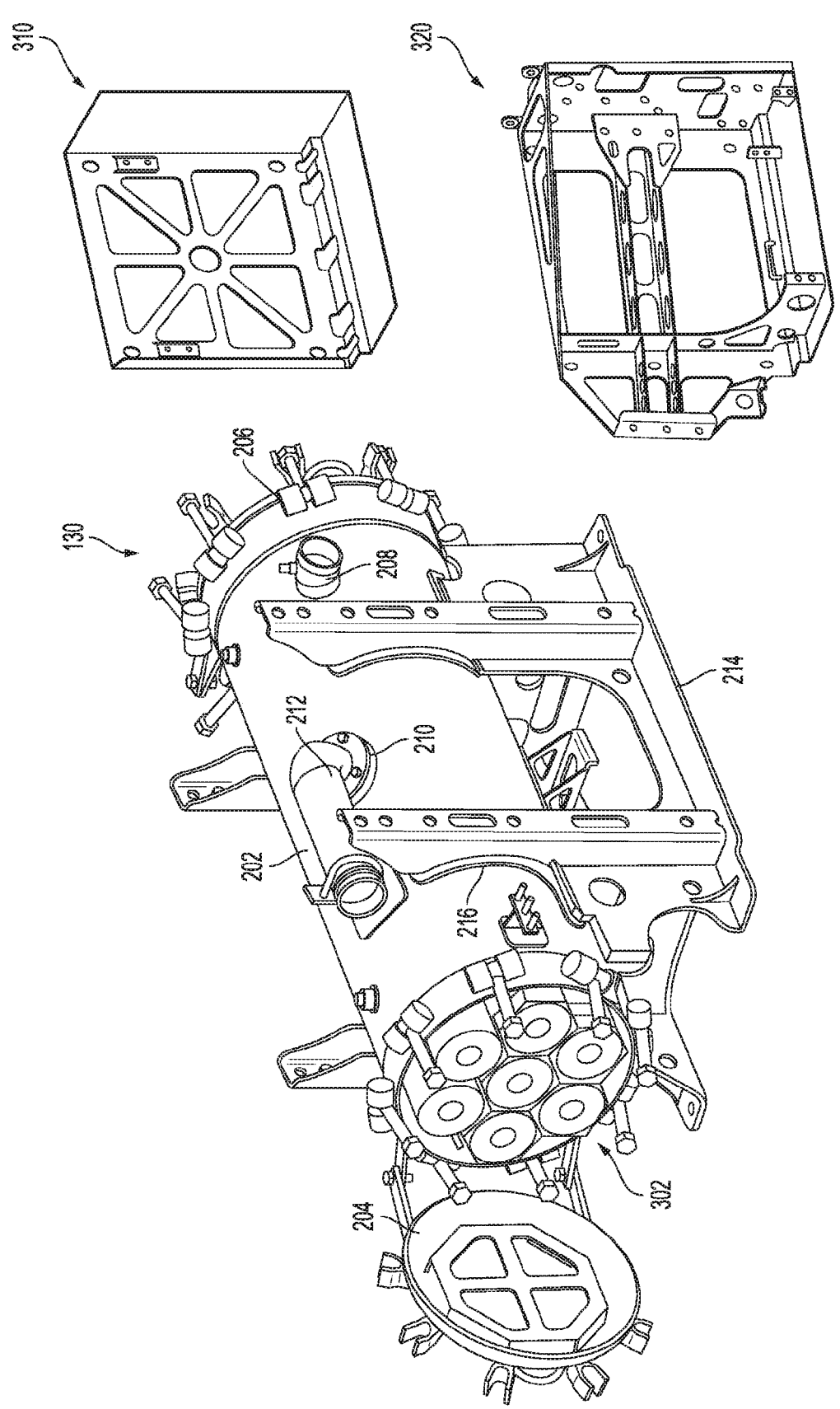

Turning now to FIGS. 2-3, an embodiment of a system including an oil filter 130 is illustrated in a left perspective view (FIG. 2) and a right perspective view (FIG. 3). Oil filter 130 includes an oil filter housing 202. The oil filter housing is a hollow cylinder or tube within which a plurality of oil filter elements 302 (shown in FIG. 3) are positioned. The oil filter housing includes a central axis 209 that extends parallel to the longitudinal axis of the oil filter housing and is positioned in the center of the housing. An oil inlet 208, extending outwardly from an external surface of the oil filter housing, is positioned near one end of the oil filter housing. Oil may flow into the oil inlet, through the oil filter elements within the oil filter, and then exit the oil filter through an oil outlet 210. The oil outlet is positioned centrally along the longitudinal (e.g., horizontal) axis of the oil filter. The oil outlet comprises a cylindrical tube 212 which extends outwardly from the external surface of the oil filter housing. The cylindrical tube of the oil outlet includes a 90 degree bend, so that the tube of the oil outlet is parallel with the horizontal axis. Additional detail regarding the oil filter elements will be presented below with respect to FIGS. 9-11.

The oil filter has two filter engagement surfaces or doors positioned at either end of the oil filter housing, including a first door 204 and a second door 206. The first door is arranged on a front side of the oil filter housing proximate the oil outlet, such that oil directed out of the oil filter through the oil outlet tube passes over the first door. The second door is arranged on the back side (e.g., opposite the front side) of the housing. The doors are sealable to the ends of the oil filter housing, at an engagement ring, for example, with a plurality of fasteners (e.g., screws, bolts) positioned around the circumference of each door. In one embodiment, the engagement ring may comprise a plurality of mounting brackets for fastening the door to the oil filter housing. The doors may be sealable to the ends of the oil filter housing such that no air or fluid may pass into or out of the oil filter through the doors when the doors are closed or sealed to the oil filter housing. In one embodiment, the doors may be seep-drawn closure doors.

Thus, in one embodiment, the oil filter system includes a first door coupled to a first open end of the housing and a second door coupled to a second open end of the housing, each door movably coupled to the housing via a respective set of hinges. Each open end of the housing includes an engagement ring configured to contact a respective engagement surface of the first door and the second door. The oil filter system further includes a first set of locking members to maintain the first door in contact with the housing and a second set of locking members to maintain the second door in contact with the housing.

The oil filter system includes a frame 214. The frame may provide support to the oil filter (e.g., prevent/protect from movement and/or vibration) and allow for mounting of the oil filter to a desired vehicle structure. Further, the frame may include mountings to couple various vehicle sub-assemblies to the oil filter. FIG. 3 illustrates two frame sub-assemblies that may be mounted to the frame, including a first frame sub-assembly 310 and a second frame sub-assembly 320. Each frame sub-assembly may house a suitable vehicle sub-assembly. In one embodiment, a fuel sub-assembly may be mounted to one side of the frame via the second frame sub-assembly, and an oil cooler may be mounted to the other side of the frame via the first frame sub-assembly. Additional detail regarding the mounting of the vehicle sub-assemblies to the oil filter will be provided below with respect to FIGS. 12-18. Positioned between the frame and the oil filter housing is a set of saddles 216, e.g., sheet metal saddles. The sheet metal saddles prevent stress concentration from the fillet welds from being reacted onto the oil filter housing, which is a pressure vessel and thus may become degraded and leak oil, for example, if stress were to be applied onto the housing.

As mentioned above, the frame may be integrated with the oil filter housing. Thus, the frame and housing may be a single component. In other embodiments, the frame may be coupled to the housing of the oil filter in a suitable manner, such as fastened (e.g., with bolts), welded, adhered with an adhesive, etc. The frame may be in face-sharing contact (e.g., directly contacting) with the oil filter housing. In some embodiments, the frame may contact the housing of the oil filter, but may not be permanently or removably fixed to the housing. The frame may be shaped to receive the oil filter, e.g., have concave curvature in the region that contacts the convex curvature of the oil filter. The frame may be comprised of a suitable material, such as stainless steel or other steel, aluminum, or other suitable material. Additional detail regarding the structure of the frame in combination with the oil filter will be provided below with respect to FIGS. 4-11.

Figure 4:
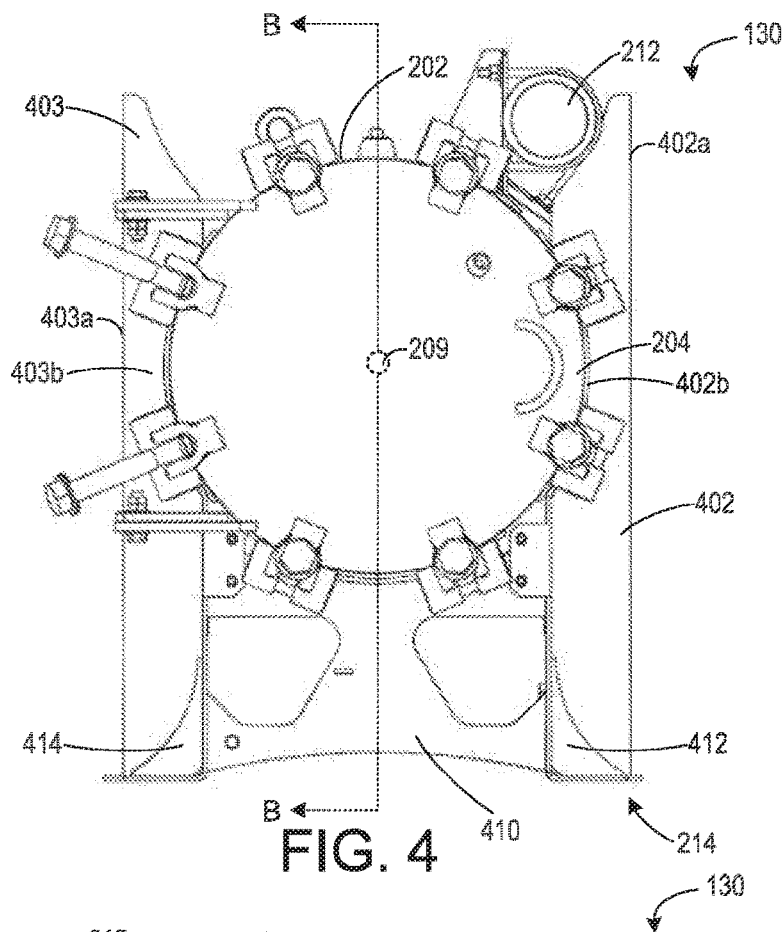
Figure 5:
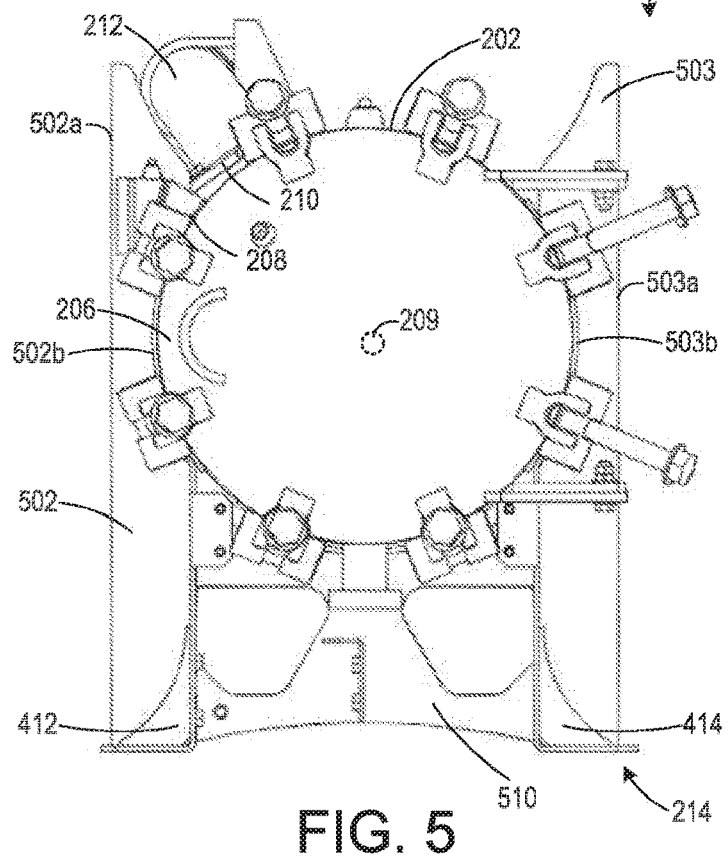
Figure 6:
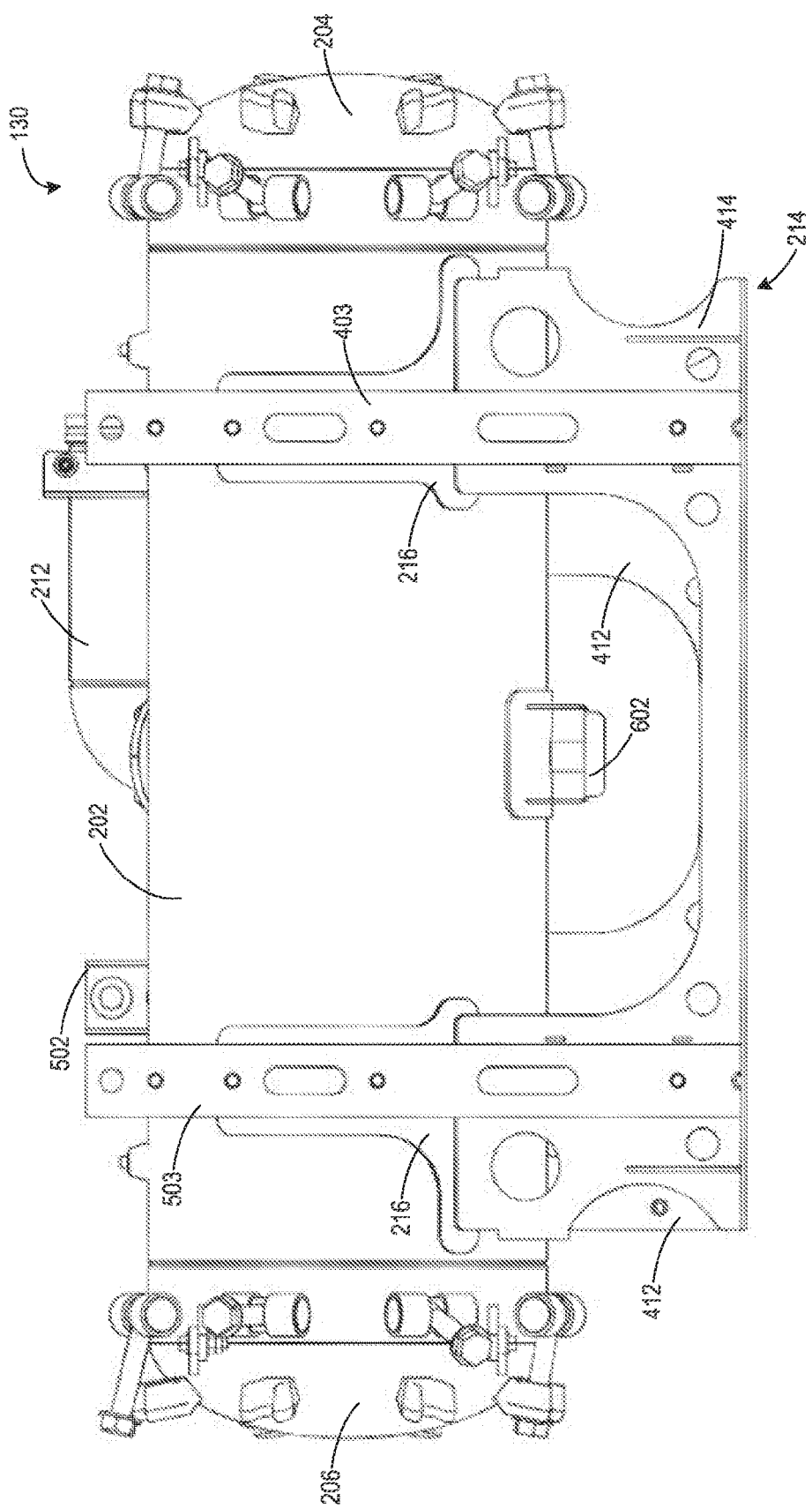
Figure 7:
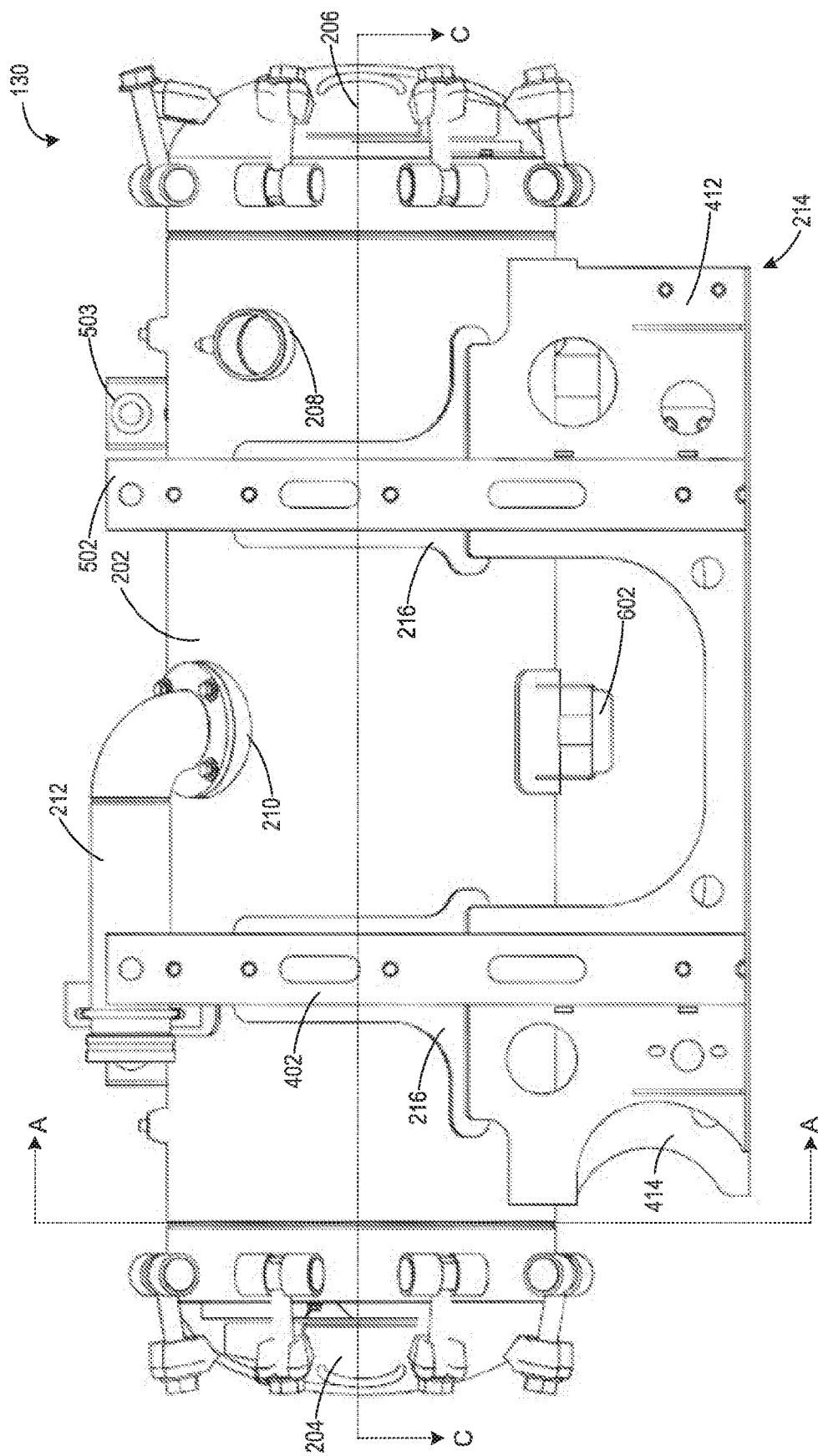
Figure 8A:
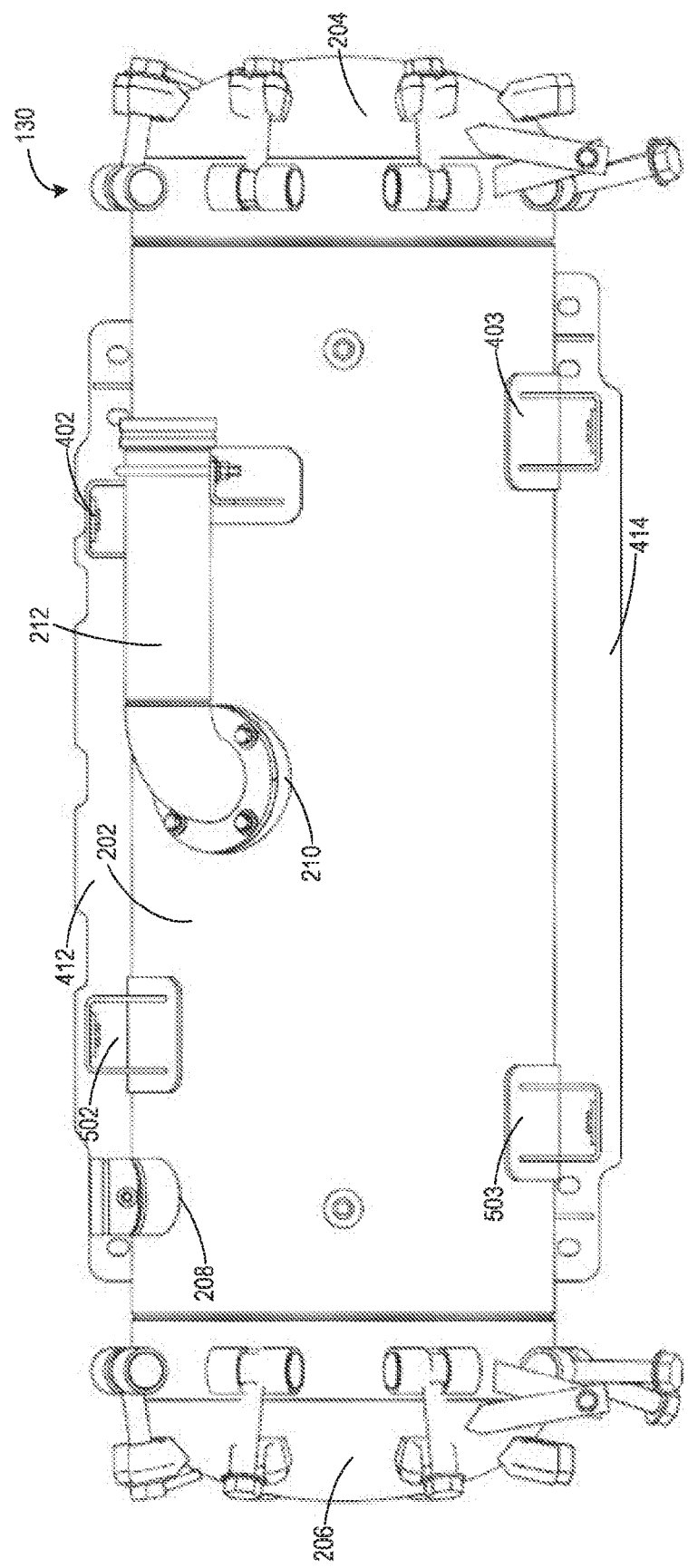
Figure 8B:
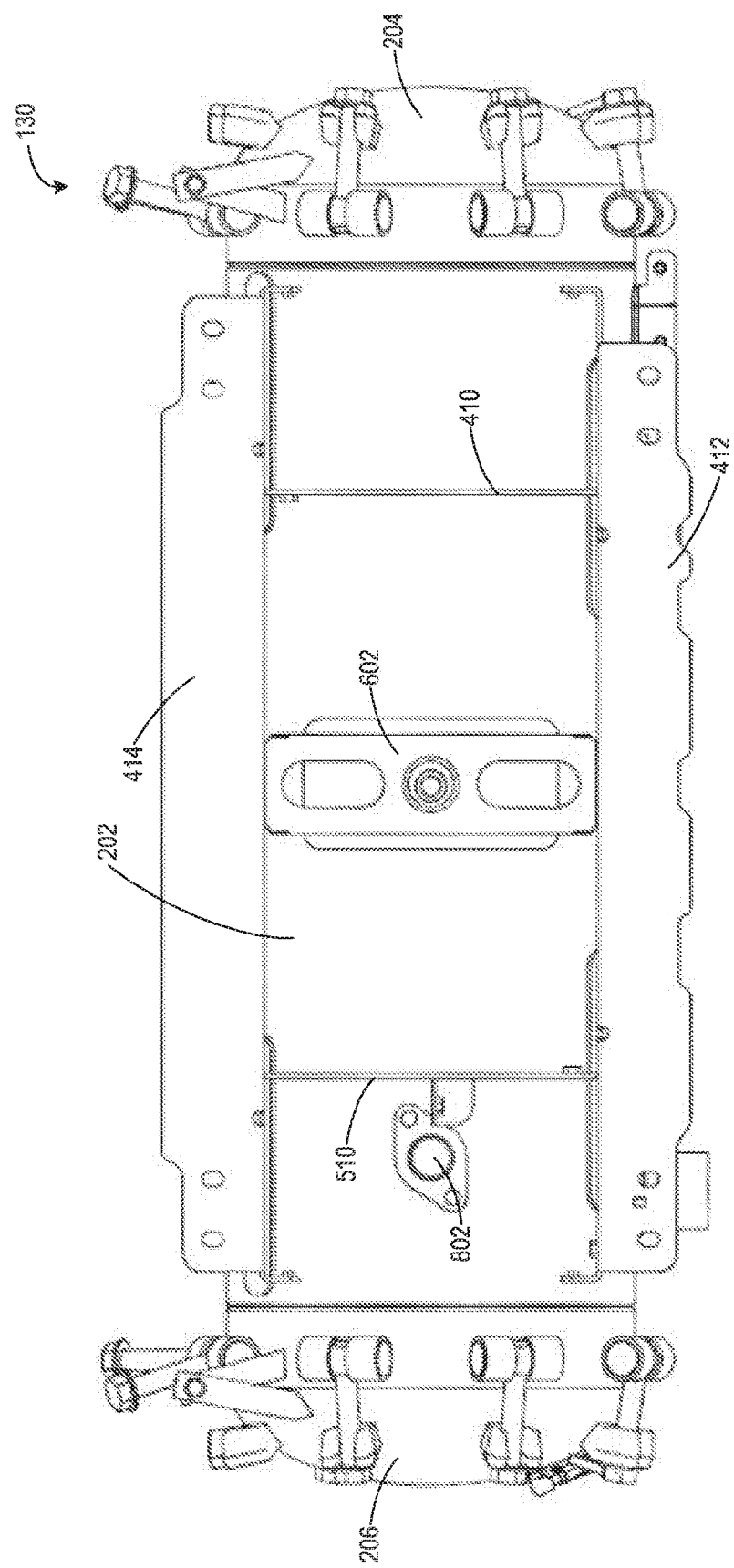

The frame and oil filter housing will be described collectively with respect to FIGS. 4-8. FIG. 4 is a head-on view of the oil filter from a front side. FIG. 5 is a head-on view of the oil filter from a back side. FIG. 6 is a side view of a first, left side of the oil filter. FIG. 7 is a side view of a second, right side of the oil filter. FIG. 8A is a top view of the oil filter and FIG. 8B is a bottom view.

As explained above, the oil filter 130 includes a hollow cylindrical housing 202 configured to hold a plurality of oil filter elements. Each end of the housing includes a door to seal the oil filter. FIG. 4 illustrates first door 204 while FIG. 5 illustrates second door 206. Further, the central axis 209 of the housing is illustrated schematically in FIGS. 4 and 5. Each door may be opened to replace, clean, service, etc., the oil filter elements in the oil filter. Unfiltered oil enters into the oil filter via oil inlet 208, and filtered oil exits out of the oil filter at oil outlet 210, which is coupled to cylindrical tube 212. Filtered oil may travel through the cylindrical tube en route to downstream components, such as an oil cooler, the engine, etc.

The frame 214 of the oil filter comprises two sets of support arms. The first set of support arms 403, 503 is positioned on a first side of the oil filter housing with respect it the central axis, and a second set of support arms 402, 502 is positioned on a second side of the oil filter housing, where the second side is opposite the first side with respect the central axis. For example, the first side may be the left side of the housing and the second side may be the right side of the housing. The support arms extend from a bottom of the frame and along a portion of the oil filter housing, and terminate at a position above the oil filter housing. Each of the support arms may be parallel to each other and perpendicular to a longitudinal axis of the oil filter housing. Each support arm may have a first side that faces away from the oil filter housing that is substantially straight, and a second side that faces toward the oil filter housing that is curved to accommodate the oil filter housing. The second side of each support arm may be face-sharing contact (e.g., directly contacting) with the oil filter housing along a portion of the second side.

The first set of support arms includes a first front arm 403 and a first back arm 503. The first front arm may be positioned relatively proximate the front side of the oil filter and the front door of the oil filter. The first back arm may be positioned relatively proximate the back side and back door of the oil filter. Each of the first front arm and first back arm may be positioned a suitable distance from the respective oil filter door and a suitable distance from each other. As illustrated, the distance separating the first front arm and the first back arm may be greater than a distance between the oil filter housing-door interface and the respective support arm. Each of the first (front) door and second (back) door may swing open towards the first set of support arms. Each arm of the first set of support arms may be comprised of a single continuous piece of material, or one or both of the arms may be comprised of two or more pieces of material coupled (e.g., bolted, welded, etc.) together. Each arm of the first set of support arms includes one or more openings to facilitate mounting of a frame sub-assembly. The first front arm includes a straight surface 403a and a curved surface 403b opposite the straight surface. The curved surface may have a curvature complimentary to the curvature of the housing and may be contact with the housing and/or with an intervening saddle. Likewise, first back arm includes a straight surface 503a and a curved surface 503b opposite the straight surface. The curved surface may have a curvature complimentary to the curvature of the housing and may be contact with the housing and/or with an intervening saddle. The straight surface 403a and the straight surface 503a may be located in the same plane.

The second set of support arms includes a second front arm 402 and a second back arm 502. The second front arm may be positioned relatively proximate the front side of the oil filter and the front door of the oil filter. The second back arm may be positioned relatively proximate the back side and back door of the oil filter. Each of the second front arm and second back arm may be positioned a suitable distance from the respective oil filter door and a suitable distance from each other. As illustrated, the distance separating the second front arm and the second back arm may be greater than a distance between the oil filter housing-door interface and the respective support arm. Each of the first (front) door and second (back) door may swing open away the second set of support arms. Each arm of the second set of support arms may be comprised of a single continuous piece of material, or one or both of the arms may be comprised of two or more pieces of material coupled (e.g., bolted, welded, etc.) together. Each arm of the second set of support arms includes one or more openings to facilitate mounting of a frame sub-assembly. The second front arm may be positioned proximate the oil outlet and cylindrical tube. The second front arm may be in contact with the oil outlet/ cylindrical tube to provide support to the cylindrical tube. The second front arm includes a straight surface 402a and a curved surface 402b opposite the straight surface. The curved surface may have a curvature complimentary to the curvature of the housing and may be contact with the housing and/or with an intervening saddle. Likewise, second back arm includes a straight surface 502a and a curved surface 502b opposite the straight surface. The curved surface may have a curvature complimentary to the curvature of the housing and may be contact with the housing and/or with an intervening saddle. The straight surface 402a and the straight surface 502a may be located in the same plane.

Each of the support arms may terminate at a coupling to a respective side support plate of the frame. The first set of support arms may be coupled to a first side support plate 414, while the second set of support arms may be coupled to a second side support plate 412. The first side support plate may extend along the first (e.g., left) side of the oil filter housing, while the second side support plate may extend along the second (e.g., right) side of the oil filter housing. Each of the side support plates may include various cut-outs, openings, or other sub-structures. Further, each of the side support plates may be in face-sharing (e.g., directly contacting) contact with the oil filter housing along a top side of each respective side support plate.

Each side support plate is coupled to two bottom support plates, including a front bottom support plate 410 and a back bottom support plate 510. (The bottom support plates may be referred to as brackets in some examples.) The front bottom support plate may span a width of the frame (e.g., may be coupled across the oil filter housing), underneath the oil filter housing, from the first side support plate to the second side support plate, and may be located proximate the first front support arm and the second front support arm. In some embodiments, the front bottom support plate may be in face-sharing contact with a portion of the oil filter housing (e.g., directly contacting), while in other embodiments a gap may be present between the front bottom support plate and the oil filter housing.

The back bottom support plate may span a width of the frame (e.g., may be coupled across the oil filter housing), underneath the oil filter housing, from the first side support plate to the second side support plate, and may be located proximate the first back support arm and the second back support arm. In some embodiments, the back bottom support plate may be in face-sharing contact with a portion of the oil filter housing (e.g., directly contacting), while in other embodiments a gap may be present between the back bottom support plate and the oil filter housing. Each of the front and back bottom support plates may include cut-outs, openings, mountings, or other sub-structures.

In some embodiments, the first front support arm and the front bottom support plate may couple to the first side support plate at a common location. Likewise, in some embodiments, the second front support arm and the front bottom support plate may couple to the second side support plate a common location.

In some embodiments, the first back support arm and the back bottom support plate may couple to the first side support plate at a common location. Likewise, in some embodiments, the second back support arm and the back bottom support plate may couple to the second side support plate a common location.

However, as will be appreciated in FIG. 8A, the second set of support arms (arms 402 and 502) may be spaced closer together than the first set of support arms (arms 403 and 503), and thus the first set of support arms may be spaced apart more than the second set of support arms. Thus, the front bottom support plate and back bottom support plate may not couple to the first side support plate and second side support plate at common locations with all the respective support arms. Rather, in some embodiments the front and back bottom support plates may couple to the first side support plate at a common location with the first set of support arms (arms 503 and 403) while couple to the second side support plate at locations offset from the second set of support arms.

In some embodiments, the frame may also include a middle brace 602 positioned under the oil filter housing and between the front and back bottom support plates. The middle brace may be coupled to each of the front and back bottom support plates. Further, in some embodiments a dirty side oil drain 802 may be present on the bottom of the oil filter housing, as shown in FIG. 8B.

Figure 9:
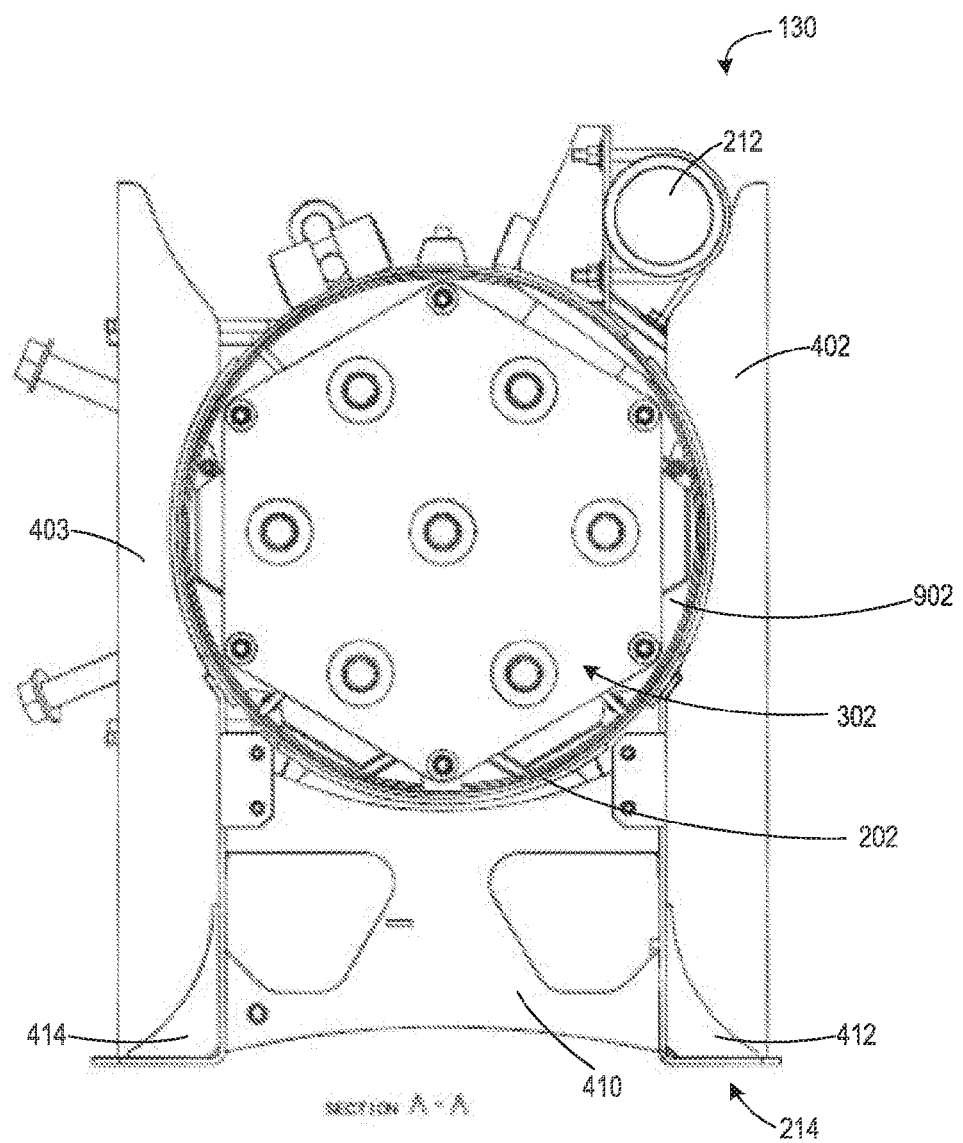
Figure 10:
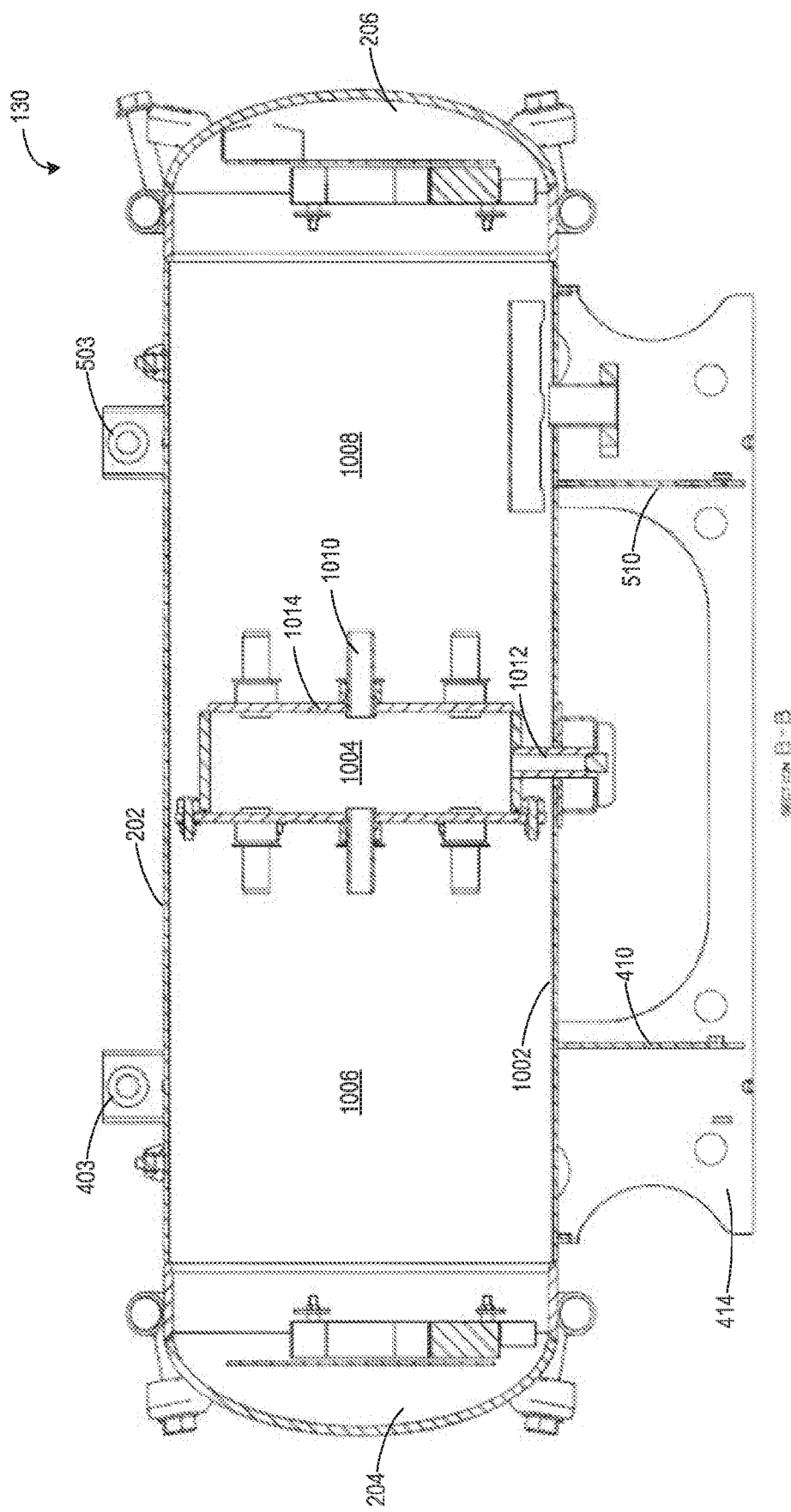
Figure 11:
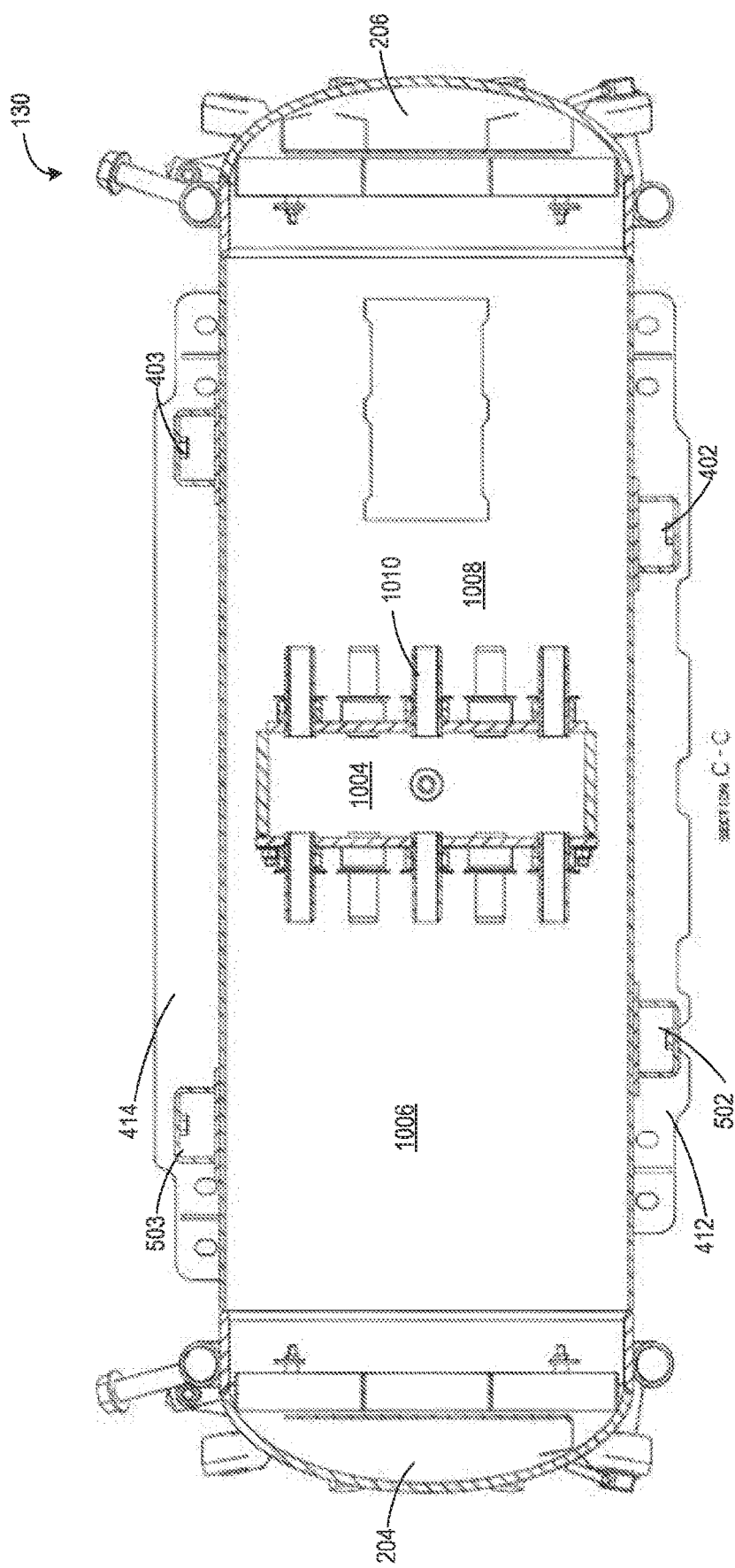

Turning now to FIGS. 9-11, various cross-sectional views of the oil filter 130 are illustrated. FIG. 9 is a first cross-sectional view taken from section A-A shown in FIG. 7. First front support anti 403, second front support arm 402, front bottom support plate 410, first side support plate 414, and second side support plate 412 of frame 214 are illustrated in the cross-sectional view of FIG. 9. Further, the interior 902 of the oil filter is also illustrated, including a plurality of filter elements 302.

FIG. 10 is a second cross-sectional view of the oil filter 130 take from section B-B shown in FIG. 4. The first set of support arms (arms 403 and 503), first (e.g., front) door 204, second (e.g., back) door 206, and first side support plate 414 are illustrated in FIG. 10. Further, the front bottom support plate 410 and back bottom support plate 510 are illustrated in cross-section.

As described previously, the oil filter housing 202, in an embodiment, is a hollow tube. (The tube may be cylindrical, or have some other shape, e.g., oval or square in cross section, that defines a hollow, elongate interior that is shaped to receive one or more filter elements.) As shown in FIG. 10, the oil filter housing includes an oil filter housing wall 1002. The inside of the oil filter (e.g., inside the oil filter housing) may be split up into two cavity portions with a central oil passage 1004. A first cavity 1006 is formed by the oil filter housing wall, one of the engagement surfaces or doors, and the central oil passage. A second cavity 1008 is formed by the oil filter housing wall, the opposite door, and the central oil passage. As shown in FIGS. 3 and 9, seven oil filter elements may be positioned in each cavity of the oil filter. In this way, the oil filter may contain fourteen oil filter elements in total. In other embodiments, the oil filter may include more or less than fourteen oil filter elements.

The central oil passage comprises a hollow cylinder positioned centrally along the longitudinal axis of the oil filter. The central oil passage includes a fluid opening which allows oil to pass from the interior cavity of the central oil passage to the oil outlet.

Each oil filter element may be annular shaped with a cylindrical bore centered along a longitudinal axis of the oil filter element. The oil filter element comprises a porous material, wherein the porous material may be one or more of a cellulose media or a fibrous media., for example. The pores of the oil filter element allow oil to pass through the filter element while entraining larger particles and/or impurities suspended in the oil. These particles may be too large to pass through the pores, thereby causing them to remain within the porous material of the oil filter element. As such, a smaller pore size of the porous media may allow more particles to be removed from the engine oil.

Engine oil may flow from a supply source (e.g., the engine) into the oil filter through the oil inlet. Engine oil passes through the porous material of the oil filter element and into the cylindrical bore. Engine oil then flows through the bore toward the central oil passage. Each filter element may be coupled to a respective cylindrical projecting tube (such as cylindrical projecting tube 1010), which allows engine oil to flow from the cylindrical bore of the oil filter element to the interior cavity of the central oil passage. Engine oil then flows through the cavity of the central oil passage and out the fluid opening to the oil outlet. Filtered oil may then return to the engine.

In some embodiments, a clean side oil drain 1012 may be present in the central oil passage. The drain may allow excess oil to drain out of the oil filter and collect in a sump (e.g., oil pan) under the oil filter, for example. The clean side drain may used if a catastrophic failure of filter were to occur, then the clean side of the oil filter housing may be compromised. This clean side oil drain may have a magnet drain plug that can be checked for metallic fragments. If it does have metallic fragments then the clean chamber would need cleaned out. A removable cover 1014 can be taken off to give access to the clean chamber (central oil passage 1004). This allows canister to be re-used without risk of future cleanliness issues of the engine.

FIG. 11 is a third cross-sectional view of the oil filter 130 take from section C-C shown in FIG. 7. The first set of support arms (arms 403 and 503), second set of support arms (arms 402 and 502), first (e.g., front) door 204, second (e.g., back) door 206, first side support plate 414, and second side support plate 412 are illustrated in FIG. 11. Further, the various oil cavities and passages of the oil filter (including first cavity 1006, second cavity 1008, and central oil passage 1004) are illustrated, along with the projecting tubes configured to couple to the plurality of filter elements (including projecting tube 1010).

Figure 12:
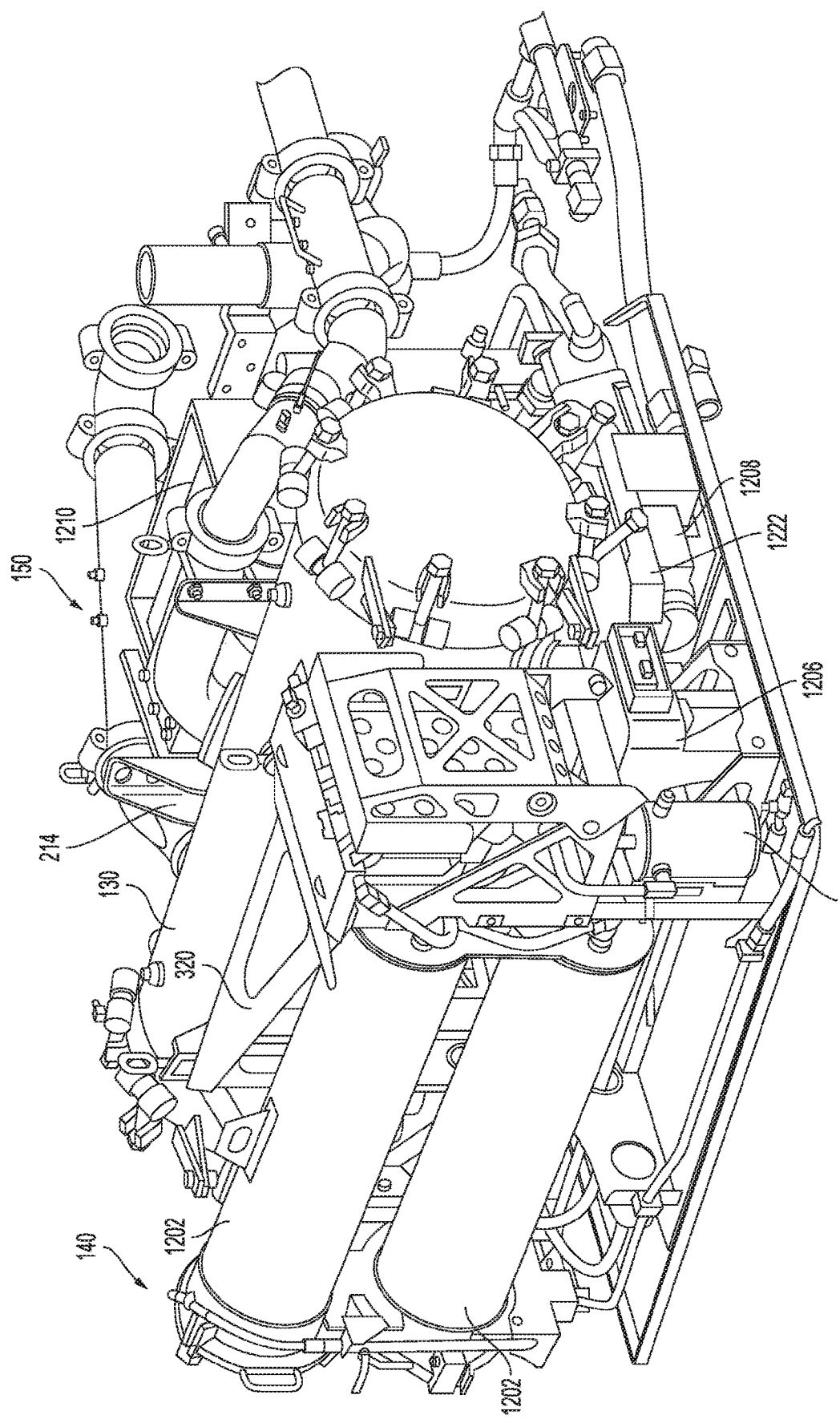
Figure 13:
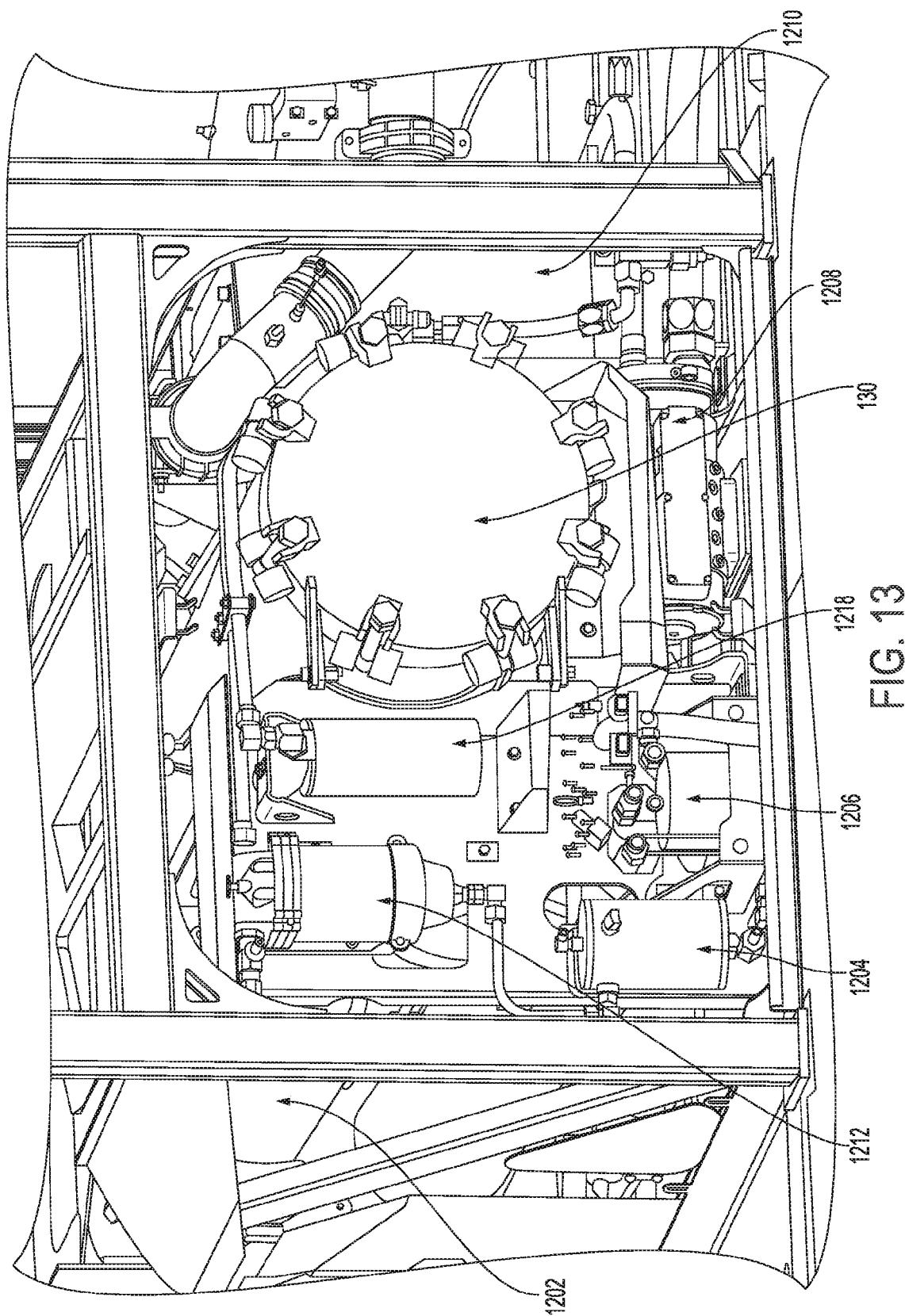
Figure 14:
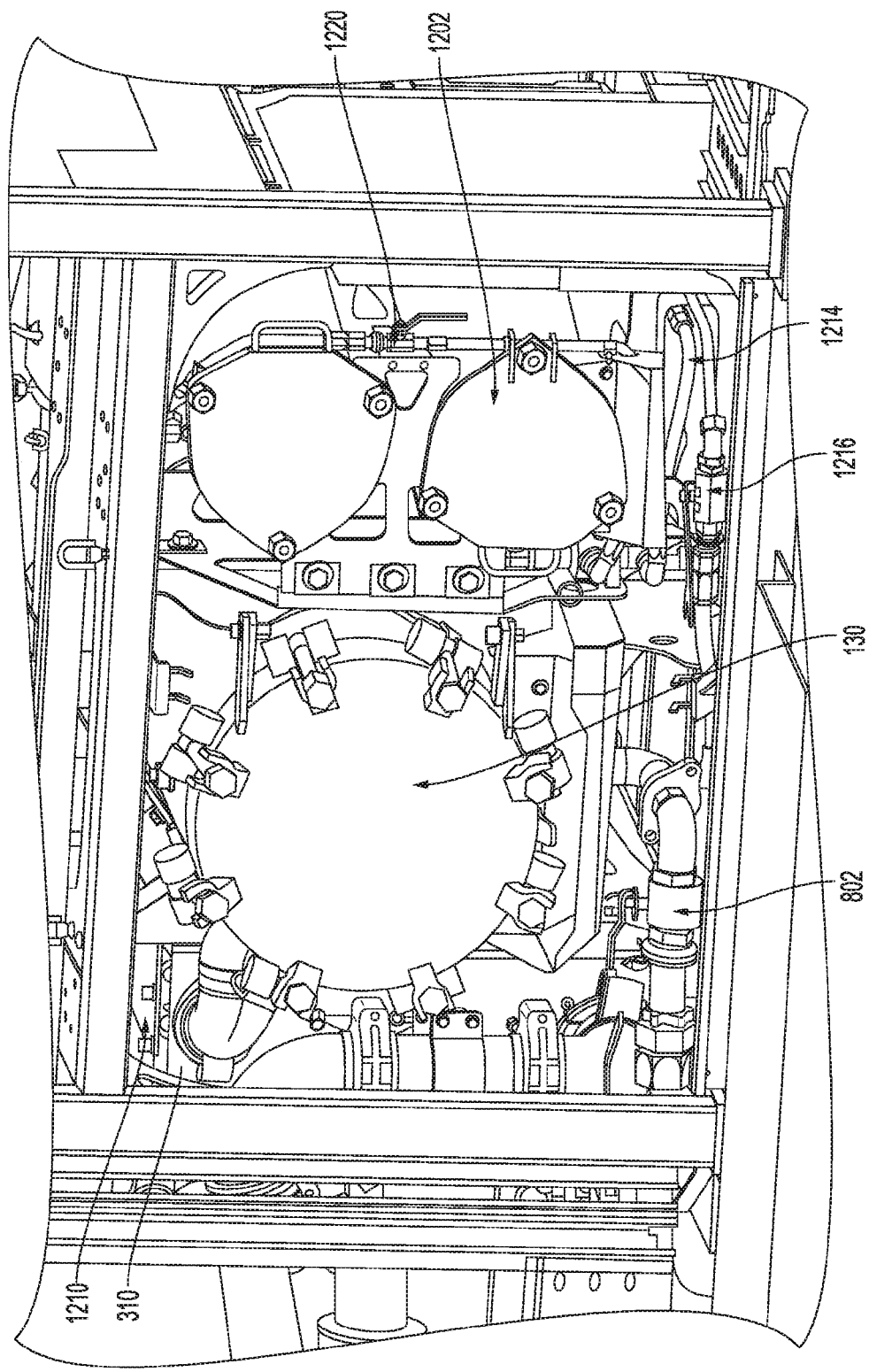
Figure 16:
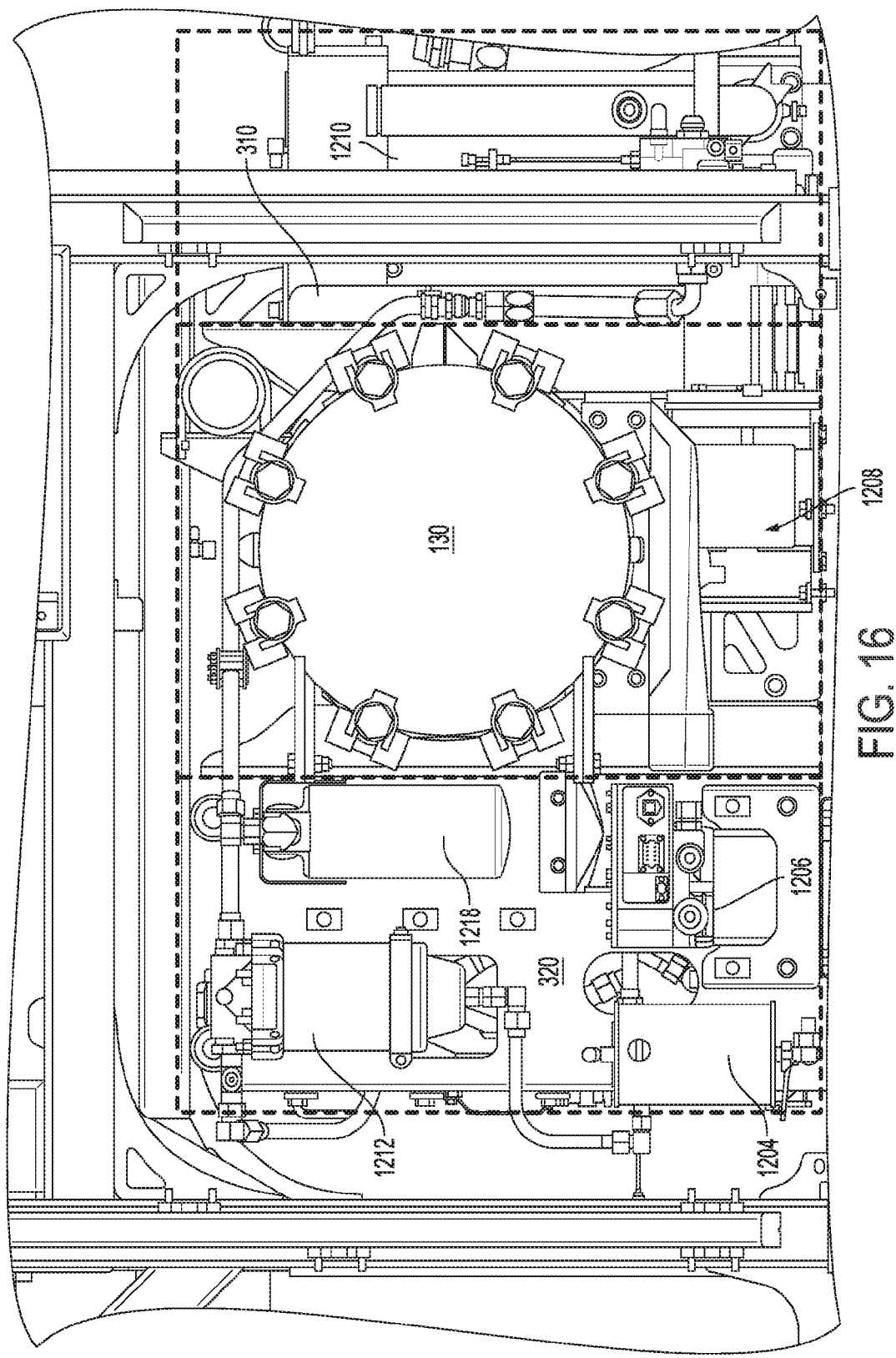
Figure 17:
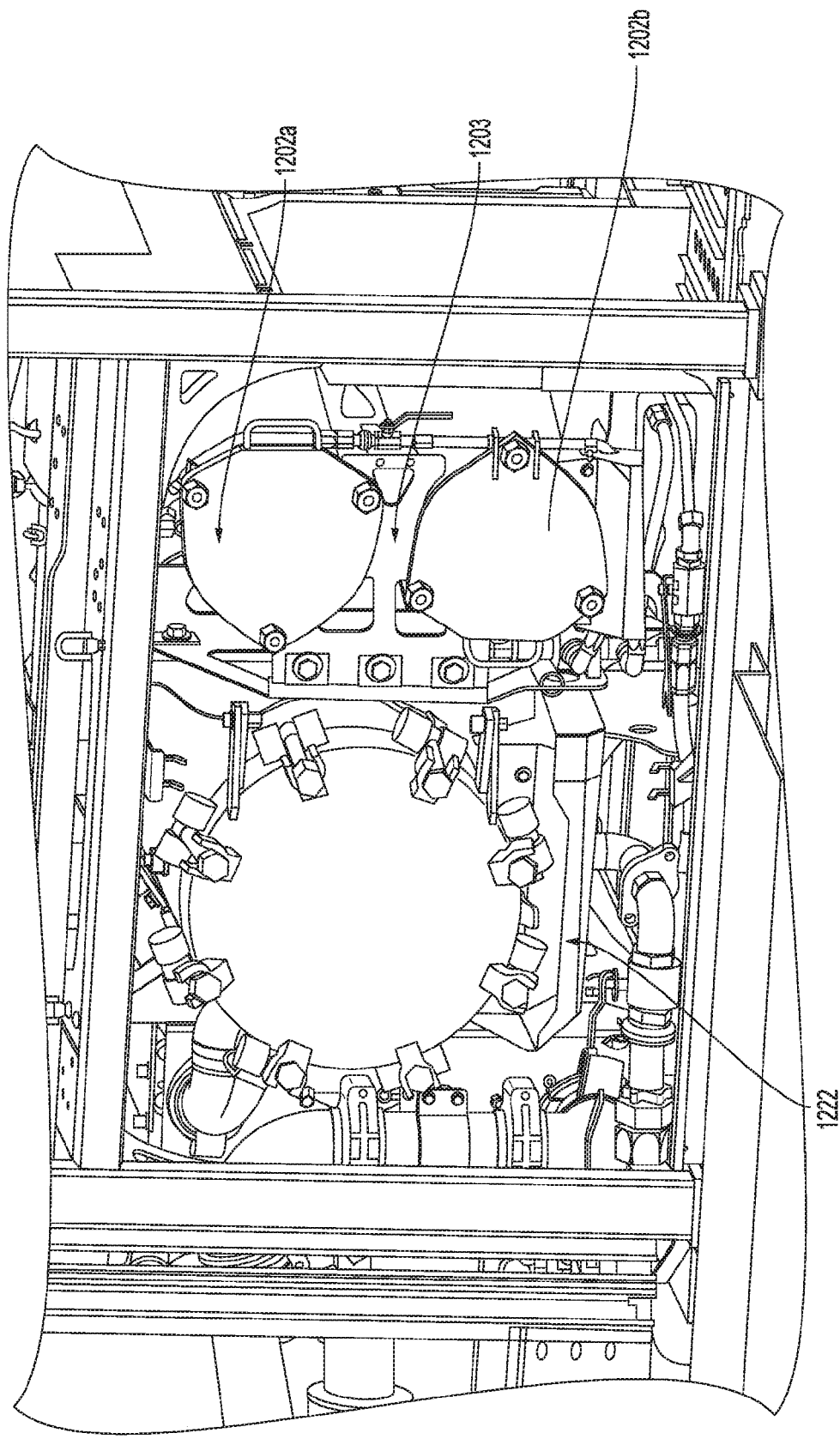
Figure 18:
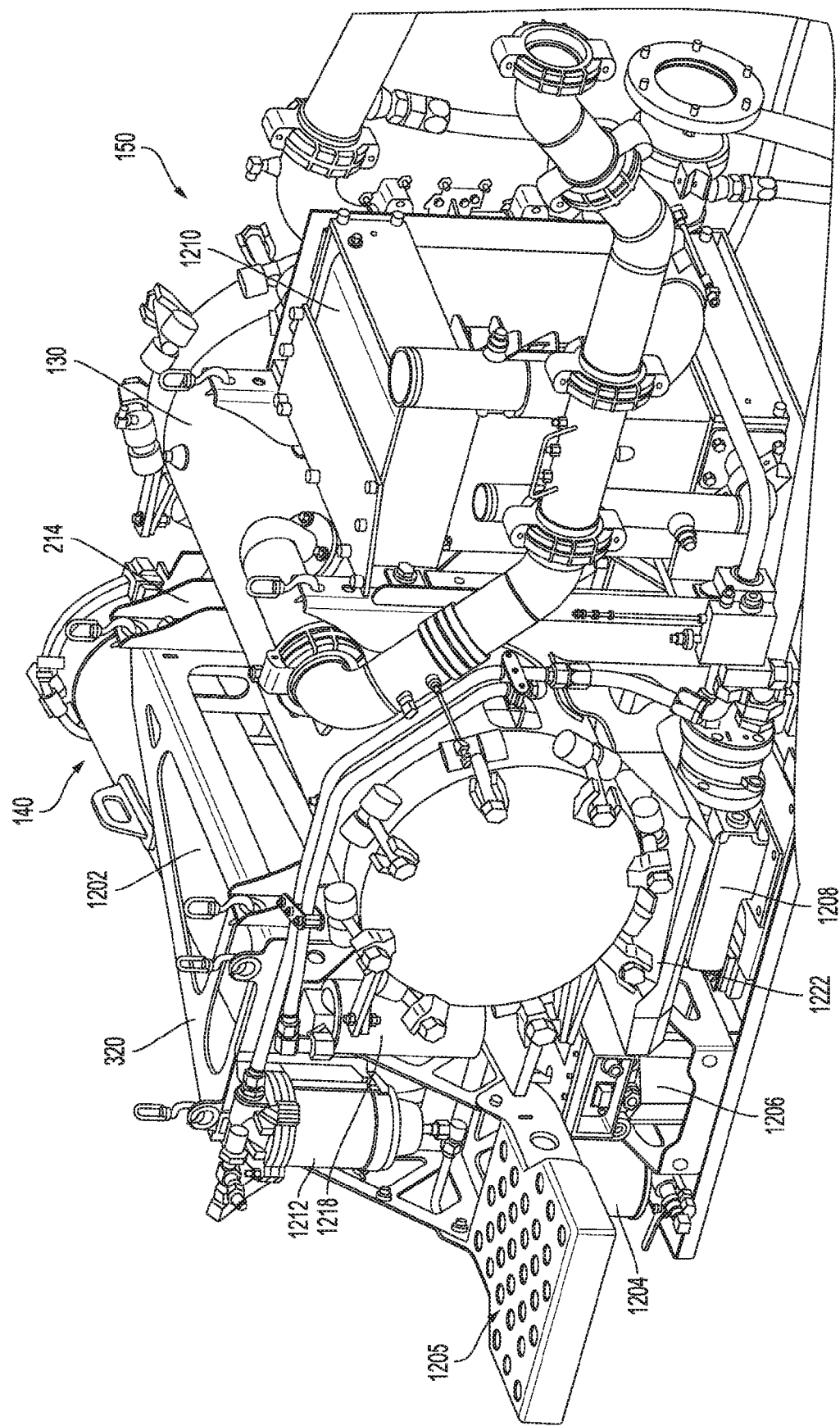

As explained above, the oil filter may be coupled to one or more vehicle sub-assemblies via the frame. FIGS. 12-18 illustrate various embodiments of an oil filter system having and oil filter (such as described in regards to any of FIGS. 1-11) coupled to a fuel sub-assembly and an oil cooler via the frame and frame sub-assemblies described above. FIGS. 12-18 are described collectively, and illustrate the oil filter 130, fuel sub-assembly 140, and oil cooler sub-assembly 150 coupled together via frame 214, first frame sub-assembly 310, and second frame sub-assembly 320. Specifically, FIG. 12 and FIG. 13 are front perspective views of an embodiment of an oil filter system, FIG. 14 is a rear perspective view of the oil filter system, FIG. 15 includes side and front views of sub-assemblies of the oil filter system, FIG. 16 is a front side elevation view of the oil filter system, and FIG. 17 and FIG. 18 are additional front perspective views of embodiments of the oil filter system.

The fuel sub-assembly includes a fuel filter 1202 (herein illustrated as two fuel filter stacked vertically), a fuel drain tank 1204, a fuel transfer pump 1206, a fuel water separator 1212, a fuel heater 1214, a fuel drain 1216, a fuel strainer 1218, and a fuel vent 1220. The components of the fuel sub-assembly are mounted to the frame of the oil filter via the second frame sub-assembly 320.

The oil cooler sub-assembly includes an oil cooler 1210 mounted to the frame of the oil filter via first frame sub-assembly 310. The oil cooler may be a suitable heat exchanger, such as a brazed heat exchanger (BHE), configured to transfer heat between oil and a thermal fluid, such as engine coolant.

Also shown in FIGS. 12-18 is a pre-lube pump 1208 and an oil pan 1222, positioned under the oil filter and configured to collect oil that drains out of the oil filter. The pre-lube pump may pump oil from the oil pan and/or oil filter to various engine components.

In this way, the fuel components may be consolidated into one sub-assembly. As shown in FIG. 17, the fuel filter doors 1202a and 1202b may be flipped relative to previous configurations, enabling the elimination of a "diaper door" and providing for an increased gap 1203 between the filter doors. The canisters of the fuel filter are also angled to improve drainage. In some embodiments, a step 1205 may be provided to improve access to the baggie filters, for example in front of the fuel-water separator. Further, the fuel heater may heat fuel via the oil in cold ambient conditions, and may prevent freezing of the fuel heater.

By packaging the oil filer, fuel sub-assembly, and oil cooler sub-assembly in the manner described above, lower costs may be obtained due to a smaller package size and weight reduction. For example, the entire assembly may be approximately 14 inches (35 cm) shorter than previous configurations, leaving increased space for a coalescer and optimizing a water inlet pipe. Further, the entire assembly may be approximately 175 pounds (80 kg) lighter than previous configurations. The configuration described herein may also provide for enhanced serviceability, due to increased fuel-water separator and pre-lube pump access as well as the positioning of the fuel filter drain and oil filter drain on the same side of the assembly.

In other embodiments, which may applicable for use as part of or in conjunction with the embodiments of FIGS. 1-18 or otherwise, an oil filter element may be adapted to fit within multiple oil filter housings. Additionally, an oil filter mount within an oil filter housing may comprise a step around a cylindrical tube projecting from a base of the oil filter mount. As such, an oil filter element may be adapted to fit over the step of the oil filter mount. However, an older oil filter element comprising a filter media with a larger pore size may not fit over the oil filter mount with the step. In this way, older oil filter elements may not be used within newer vehicles having a higher emissions standard.

Figure 19:
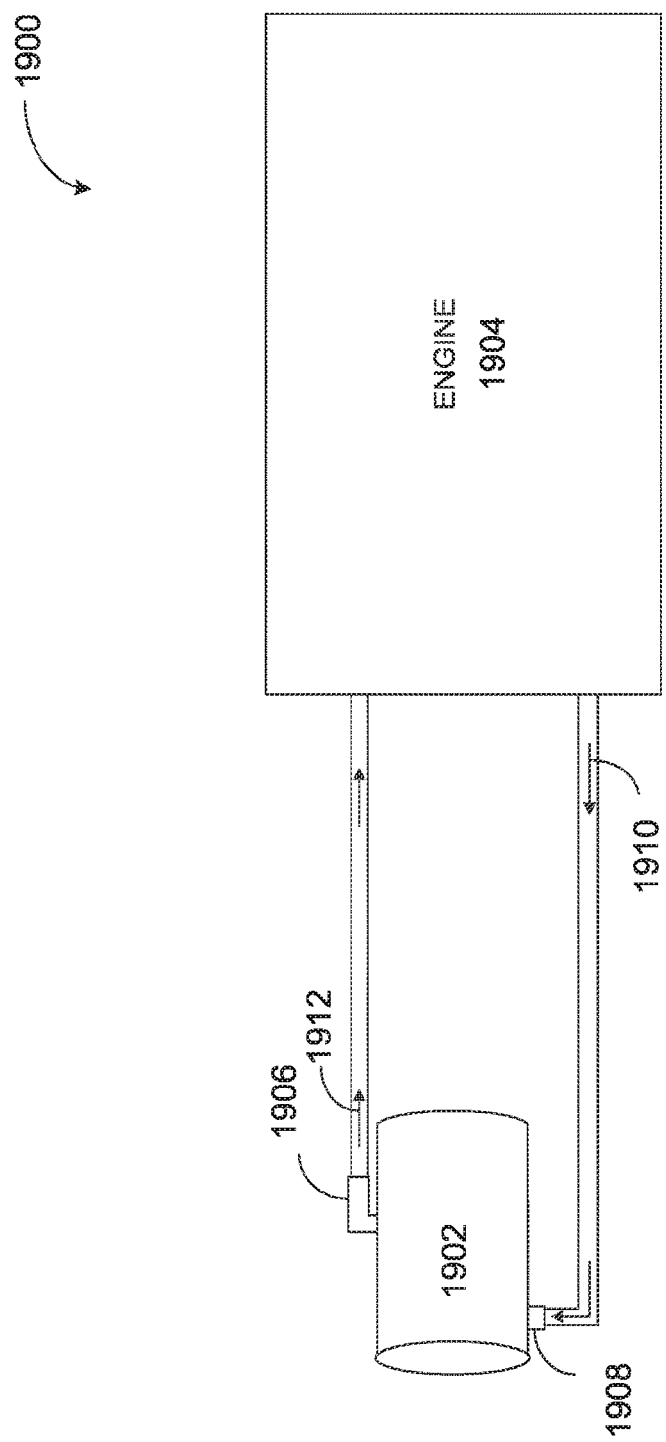
FIG. 19 shows a schematic diagram of an embodiment of an engine and an engine oil filter.
Figure 20:
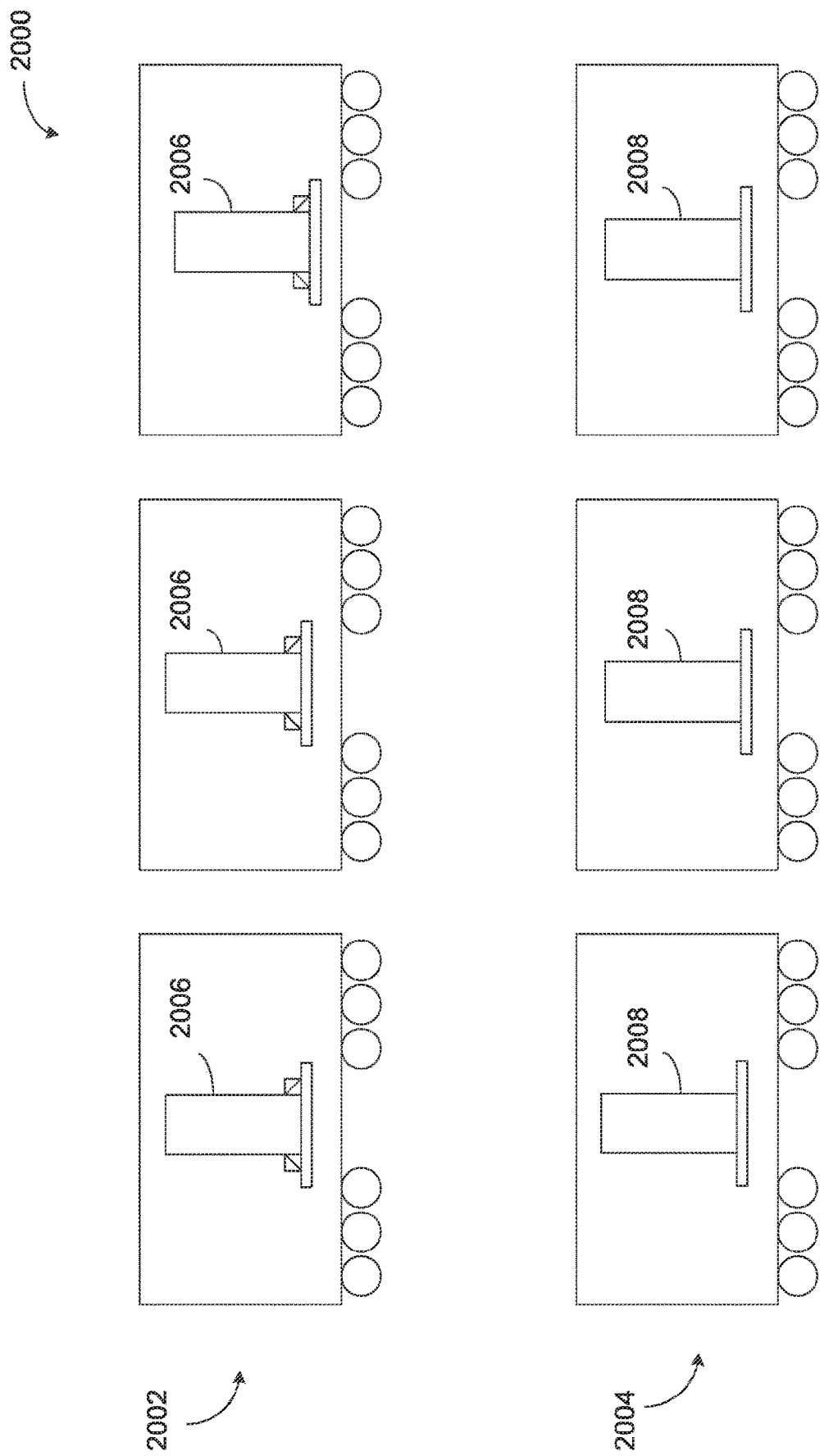
FIG. 20 shows a schematic diagram of a fleet of vehicles according to an embodiment of the invention.

FIG. 19 shows a block diagram of an exemplary embodiment of an engine system 1900 with an engine 1904, such as an internal combustion engine. In one example, engine system 1900 may be included in a fleet of vehicles 2000, as shown in FIG. 20, described further below. Engine system 1900 also includes an oil filter 1902. Oil filter 1902 may comprise an oil filter housing, an oil filter mount, and one or more oil filter elements mounted on one or more oil filter mounts within the oil filter housing (not shown in FIG. 19). Further description of the oil filter housing and the interface between the oil filter element and the oil filter mount is presented below with regard to FIGS. 21-27.

Returning to FIG. 19, engine oil may be used to lubricate various engine components within engine 1904, such as pistons, bearings which allow rotation of a crankshaft and camshaft, or the like. Before oil is routed to the various engine components, the engine oil may first pass through an oil filter to remove contaminants such as dirt, carbon, and metallic particles. In this way, engine degradation from abrasive wear between particles and engine components may be reduced.

As shown in. FIG. 19, engine oil 1910 may flow from the engine 1904 to an oil inlet 1908 of the oil filter 1902. The engine oil 1910 then flows through the inside of the oil filter 1902 where contaminants may be filtered from the engine oil 1910. After passing through the oil filter 1902, filtered engine oil 1912 exits at an oil outlet 1906 of the oil filter 1902 and flows back into the engine 1904 where the oil may be used again by the engine components.

FIG. 20 shows a schematic of a fleet of vehicles 2000. The fleet of vehicles 2000 comprises a first group of vehicles 2002 and a second group of vehicles 2004. In one example, the vehicles of the first group and second group may be rail vehicles. In another example the vehicles of the first group and second group may be another type of vehicle such as on-road transportation vehicles or mining vehicles, marine vessels, or other off-highway vehicles (OHV), or the like.

The first group of vehicles 2002 and the second group of vehicles 2004 may have different emissions standards, or may be certified to meet different emission standards. The emissions standards for each group of vehicles may be defined with a rated engine emissions level. In one example, the rated engine emissions level may include an emissions level indicative of a maximum steady state emissions level of the vehicle. In another example, the rated engine emissions level may include an emissions level indicative of a maximum transient emissions level of the vehicle. Additionally, the first group of vehicles 2002 and the second group of vehicles 2004 may include different oil filters comprising oil filter elements with different pore sizes. An oil filter having a smaller pore size may improve oil quality relative to an oil filter having a larger pore size.

The first group of vehicles 2002 shown in FIG. 20 may have a first rated engine emissions level. As shown in FIG. 20, the first group of vehicles 2002 has a first oil filter interface 2006. The first oil filter interface has a first oil filter mount with a linearly outwardly projecting step surrounding a first cylindrical projecting tube. Further details on embodiments of the first oil filter interface are presented below with reference to FIG. 25.

The second group of vehicles 2004 may have a second rated engine emissions level. The second rated engine emissions level may be higher than the first rated engine emissions level of the first group of vehicles 2002. Thus, pursuant to governmental regulations for example, the second group of vehicles may be allowed to produce more emissions than the first group of vehicles. As shown in FIG. 20, the second group of vehicles 2004 has a second oil filter interface 2008. The second oil filter interface 2008 is different than the first oil filter interface 2006. The second oil filter interface 2008 has a second oil filter mount with a cylindrical projecting tube. The second oil filter mount does not have the linearly projecting step of the first oil filter mount. Further details on embodiments of the first and second oil filter interfaces and mounts are presented below with reference to FIGS. 22-27.

The fleet of vehicles 2000 may use two or more types of oil filters, each oil filter having a different pore size. A first oil filter with a first pore size may be fittable to both the first oil filter interface 2006 and the second oil filter interface 2008. Specifically, an opening or neck of the first oil filter may be wider than the first oil filter mount and the second oil filter mount. Thus, the first oil filter may be used in both the first group of vehicles 2002 and the second group of vehicles 2004. A second oil filter with a second, larger pore size may only be fittable to the second oil filter interface of the second group of vehicles 2004. A neck of the second oil filter may be wider than the second oil filter mount but narrower than the first oil filter mount. Further details on embodiments of the first and second oil filters are presented below with reference to FIGS. 21-27.

Figure 21:
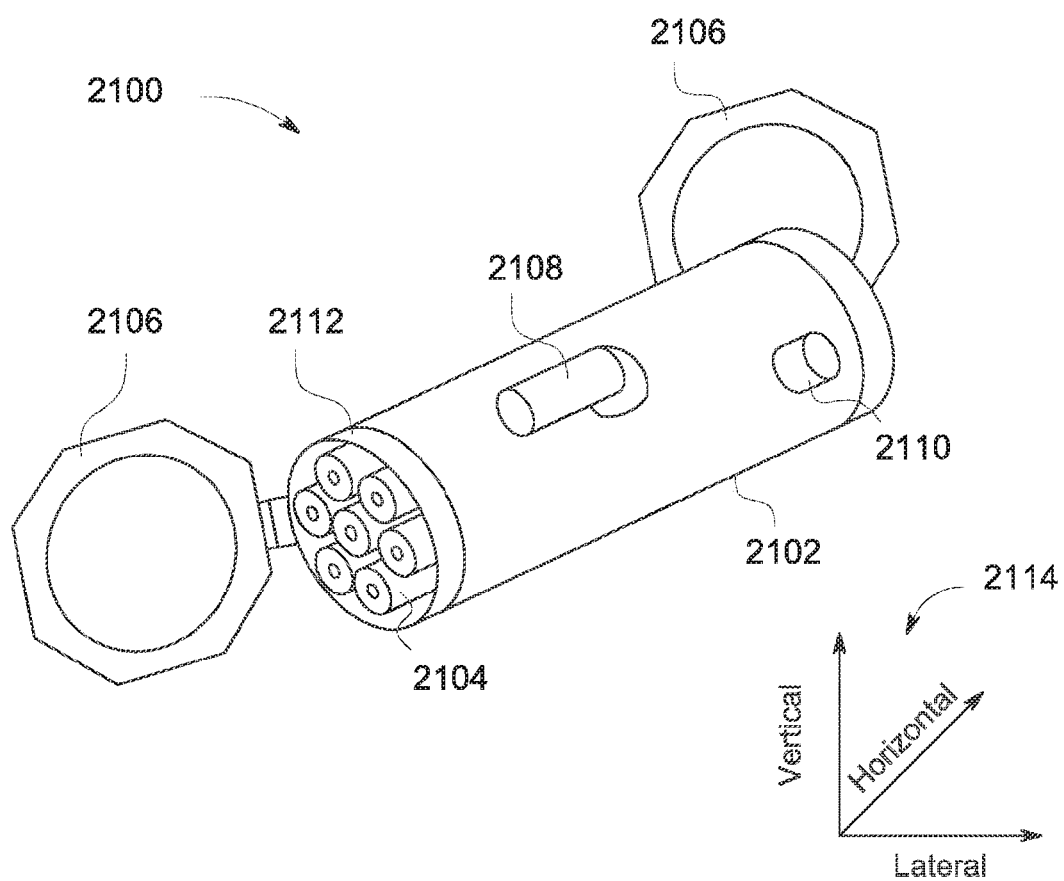
FIG. 21 shows a schematic of an oil filter according to an embodiment of the invention.
Figure 22:
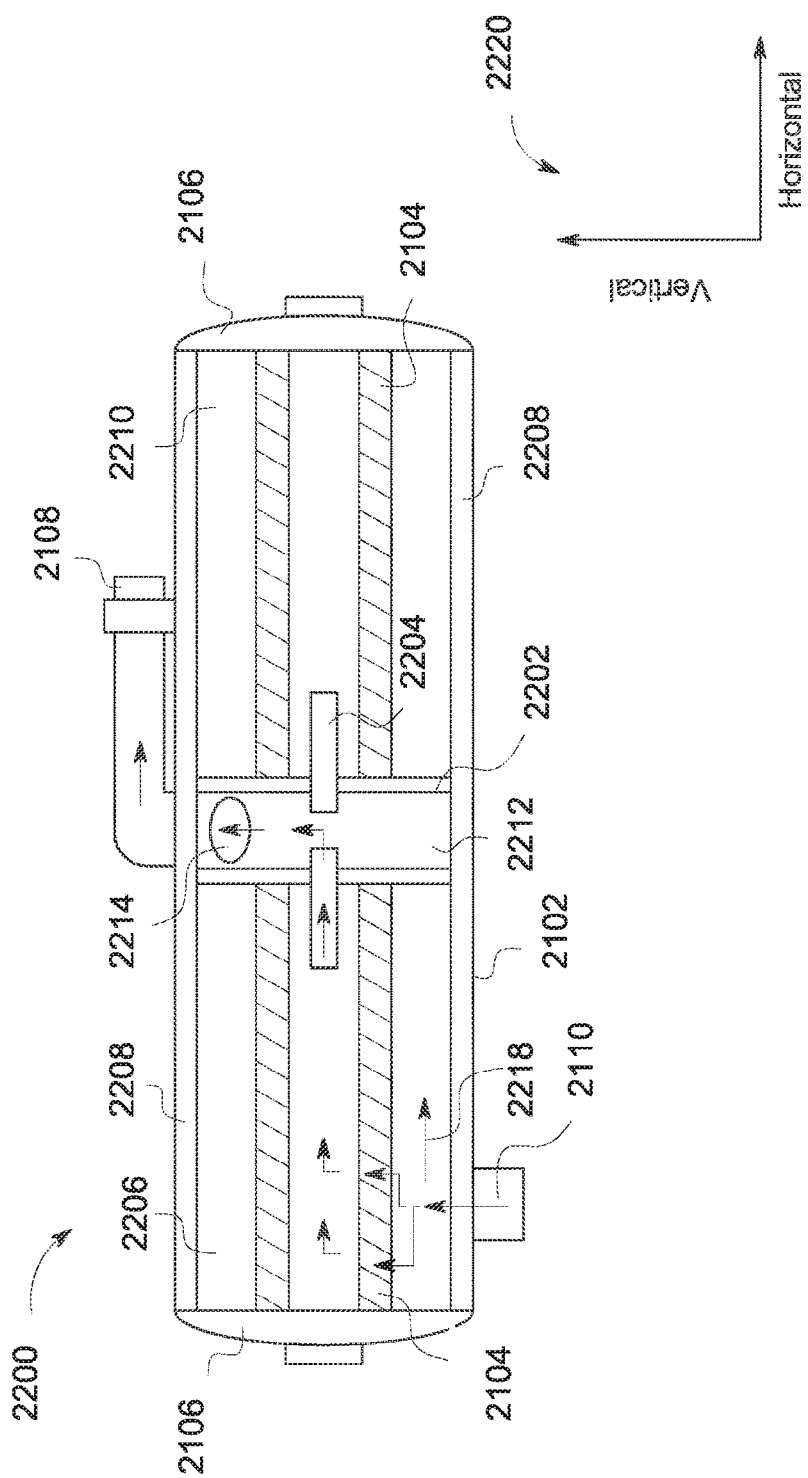
FIG. 22 shows a schematic of an oil filter with an oil filter mount according to an embodiment of the invention.
Figure 23:
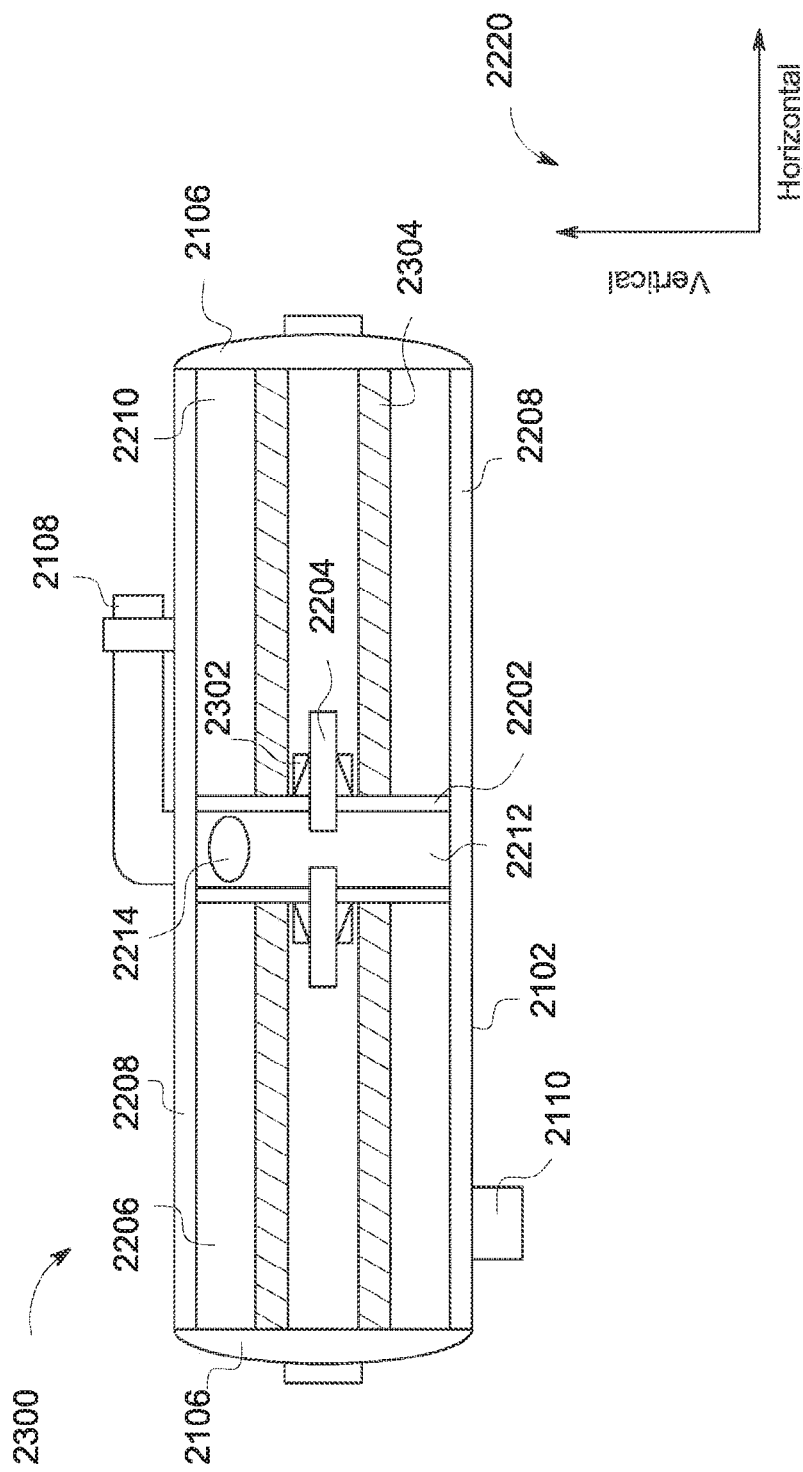
FIG. 23 shows a schematic of an oil filter with an oil filter mount according to another embodiment of the invention.

FIGS. 21-23 show schematics of different embodiments of an oil filter la may be included as the oil filter 1902 shown in engine system 1900 of FIG. 19. FIG. 21 shows an isometric view of an oil filter 2100 with respect to axis system 2114. Axis system 2114 includes a lateral axis, a horizontal axis, and a vertical axis. As shown in FIG. 21, oil filter 2100 includes an oil filter housing 2102. The oil filter housing 2102 is a hollow cylinder or tube within which a plurality of oil filter elements 2104 are positioned. An oil inlet 2110, extending outwardly from an external surface of the oil filter housing 2102, is positioned near one end of the oil filter housing 2102. Oil may flow into the oil inlet 2110, through the oil filter elements 2104 within the oil filter 2100, and then exit the oil filter through an oil outlet 2108. The oil outlet 2108 is positioned centrally along the horizontal axis of the oil filter 2100. The oil outlet 2108 comprises a cylindrical tube which extends outwardly from the external surface of the oil filter housing 2102. The cylindrical tube of the oil outlet 2108 includes a 90-degree bend, so that the tube of the oil outlet 2108 is parallel with the horizontal axis.

The oil filter 2100 has two filter engagement surfaces or doors 2106 positioned at either end of the oil filter housing 2102. The doors 2106 are sealable to the ends of the oil filter housing 2102, at an engagement ring 2112, with a plurality of fasteners (e.g., screws, bolts) positioned around the circumference of the door 2106. In one example, the engagement ring 2112 may comprise a plurality of mounting brackets for fastening the door 2106 to the oil filter housing 2102. The doors 2106 may be sealable to the ends of the oil filter housing 2102 such that no air or fluid may pass into or out of the oil filter 2100 through the doors 2106 when the doors are closed or sealed to the oil filter housing 2102. If the oil filter elements do not fit within the oil filter housing 2102 (e.g., incorrect filter element size is used), the doors 2106 may be unable to close and seal to the engagement ring 2112.

FIGS. 22-23 show a sectional side view of an oil filter, such as oil filter 2100 in FIG. 21. As such, the section shown in FIGS. 22-23 may be a section taken along a vertical axis of the oil filter 2100. The oil filter schematics of FIGS. 23-23 show an internal view of an oil filter in a plane formed by a vertical axis and horizontal axis, as shown by an axis system 2220. Turning to FIG. 22, one embodiment of an oil filter 2200 is shown. The oil filter 2200 may contain like components to those presented in FIG. 21. As discussed above with regard to FIG. 21, oil filter 2200 includes an oil filter housing 2102, two doors 2106, an oil inlet 2110, and an oil outlet 2108.

As described in FIG. 21, the oil filter housing 2102 is a hollow tube. As shown in FIG. 22, the oil filter housing 2102 includes an oil filter housing wall 2208. The inside of the oil filter 2200 (e.g., inside the oil filter housing 2102) may be split up into two cavity portions with a central oil passage 2212. A first cavity 2206 is formed by the oil filter housing wall 2208, one of the engagement surfaces or doors 2106, and the central oil passage 2212. A second cavity 2210 is formed by the oil filter housing wall 2208, the opposite door 2106, and the central oil passage 2212. For illustrative purposes, FIG. 22 shows one oil filter element 2104 positioned in each of the first cavity 2206 and the second cavity 2210. However, more than one oil filter element 2104 may be positioned within each cavity. For one example, as shown in FIG. 21, seven oil filter elements 2104 may be positioned in each cavity of the oil filter 2200. In this way, the oil filter 2200 may contain fourteen oil filter elements 2104 in total. In other examples, the oil filter 2200 may include more or less than fourteen oil filter elements 2104.

The central oil passage 2212 comprises a hollow cylinder positioned centrally along the horizontal axis of the oil filter 2200. The two ends of the cylinder form a base 2202 of an oil filter mount. The oil filter mount further includes a cylindrical projecting tube 2204 which extends outwardly from an interior cavity and the base 2202 of the central oil passage 2212 toward the filter engagement surface or door 2106 of the oil filter housing 2102. A plurality of cylindrical projecting tubes 2204 may be fluidly coupled to the interior cavity of the central oil passage 2212. In the example presented in FIG. 21, there are seven cylindrical projecting tubes 2204 in each cavity of the oil filter 2100 (e.g., one for each oil filter element 2104). The central oil passage 2212 further includes a fluid opening 2214 which allows oil to pass from the interior cavity of the central oil passage 2212 to the oil outlet 2108.

The oil filter element 2104 is annular shaped with a cylindrical bore centered along a horizontal axis of the oil filter element. The oil filter element 2104 comprises a porous material, wherein the porous material may be one or more of a cellulose media or a fibrous media. The pores of the oil filter element 2104 allow oil to pass through the filter element while entraining larger particles and/or impurities suspended in the oil. These particles may be too large to pass through the pores, thereby causing them to remain within the porous material of the oil filter element 2104. As such, a smaller pore size of the porous media may allow more particles to be removed from the engine oil. Further details on oil filter elements with different pore sizes are presented below with regard to FIGS. 24-27.

The oil filter element 2104 is adaptable to extend from the base 2202 of the oil filter mount to the filter engagement surface (e.g., door) 2106 of the oil filter housing 2102. As such, the oil filter element 2104 contacts the base 2202 at a first end of the oil filter element 2104 and contacts the door 2106 at a second end of the oil filter element 2104. As discussed above with reference to FIG. 21, the filter engagement surface or door 2106 is sealable against the second end of the oil filter element 2104. The oil filter element 2104 is fittable over the cylindrical projecting tube 2204 of the oil filter mount. Further details on embodiments of the interface between the oil filter element 2104 and the oil filter mount is presented below with reference to FIGS. 24-27.

Engine oil 2218 may flow from the engine into the oil filter 2200 through the oil inlet 2110. Engine oil 2218 passes through the porous material of the oil filter element 2104 and into the cylindrical bore. Engine oil 2218 then flows through the bore toward the central oil passage 2212. The cylindrical projecting tube 2204 allows engine oil 2218 to flow from the cylindrical bore of the oil filter element 2104 to the interior cavity of the central oil passage. Engine oil 2218 then flows through the cavity of the central oil passage 2212 and out the fluid opening 2214 to the oil outlet 2108. Filtered oil may then return to the engine.

Turning now to FIG. 23, a second embodiment of an oil filter 2300 is shown. The oil filter 2300 may contain like components to those presented in FIGS. 21-22. As discussed above with regard to FIGS. 21-22, oil filter 2300 includes an oil filter housing 2102, two doors 2106, and oil inlet 2110, and an oil outlet 2108. As shown in FIG. 22, oil filter 2300 includes a central oil passage 2212 with fluid opening 2214 to oil outlet 2108. Each end of the central oil passage 2212 forms a base 2202 of an oil filter mount.

As in FIG. 22, the oil filter mount further includes a cylindrical projecting tube 2204 which extends outwardly from an interior cavity and the base 2202 of the central oil passage 2212 toward the filter engagement surface or door 2106 of the oil filter housing 2102. However, the oil filter mount of oil filter 2300 is different than the oil filter mount of oil filter 2200 shown in FIG. 22. The oil filter mount of oil filter 2300 includes a linearly outwardly projecting step 2302 whereas the oil filter mount of oil filter 2200 does not include a step. The step 2302 is linearly outwardly projecting, for example, as it extends directly outward, in a linear direction, from the base 2202.

The linearly outwardly projecting step 2302 extends around the circumference of the cylindrical projecting tube 2204. In this example, the width, along the vertical axis, of the cylindrical projecting tube 2204 is the same in the oil filter 2200 and the oil filter 2300. Thus, the step may act as a spacer requiring an oil filter element 2304 with a wider neck and/or bore. Embodiments of the neck of the oil filter element 2304 are shown in further detail in FIGS. 24-27, discussed below. As such, the oil filter element 2304 is fittable over the step 2302 and the cylindrical projecting tube 2204 of the oil filter mount. As described with regard to FIG. 22, the oil filter element 2304 contacts the base 2202 at a first end of the oil filter element 2304 and extends from the base 2202 to the door 2106. The oil filter element 2304 contacts the door 2106 at a second end of the oil filter element. In alternate examples, the oil filter element 2304 may extend toward the door 2106 but not contact the door 2106.

The step 2302 may have various geometries and sizes depending on the oil filter embodiment. In one example, as shown in FIG. 23, the step 2302 has a triangular cross-section and extends circumferentially, as one piece, around the cylindrical projecting tube 2204. In this example, a first end of the step 2302 contacts the base 2202 of the oil filter mount at an outside edge of the step and a second end of the step 2302 contacts the cylindrical projecting tube 2204 at an inside edge of the step. In another example, the step may have a rectangular or square cross-section and extend circumferentially, as one piece, around the cylindrical projecting tube 2204. In this example, the step contacts the base 2202 at a bottom edge (along vertical axis) of the step and contacts the cylindrical projecting tube 2204 at an inside edge (along horizontal axis) of the step. In yet another example, the step may have a circular cross-section and be shaped like a doughnut (i.e., toroidal) extending circumferentially around the cylindrical projecting tube 2204.

In another embodiment, the step 2302 or spacer may not be one continuous piece extending circumferentially around the cylindrical projecting tube 2204. For example, there may be one or more steps or spacers positioned around the circumference of the cylindrical projecting tube 2204. In one example, two triangular blocks or projections may be positioned, on opposite sides, along the circumference of the cylindrical projecting tube 2204. In another example, the spacer segments may be rectangular or square blocks.

Regardless of the geometry and/or size, the step 2302 may be coupled to the cylindrical projecting tube 2204 and base 2202 of the oil filter mount in different ways. In one example, the step 2302 and the cylindrical projecting tube 2204 are integrated together. As such, the step and cylindrical projecting tube 2204 may be one piece. In another example, the step 2302 may be formed as a separate part and then fixed to the cylindrical projecting tube 2204 and/or the base 2202. The step 2302 may be fixed to these parts by welding, bolting, or other like means. In yet another example the step 2302 may comprise a rubber material and be tightly fit at the inside edge to the cylindrical projecting tube 2204 and at the outside edge to the base 2202 of the oil filter mount. The step may be tightly fit such that it contacts the outside of the cylindrical projecting tube 2204 and remains in contact with the base 2202 without shifting position. For example, the inner circumference of the step 2302 may be sized such that it is slightly smaller than the outer circumference of the cylindrical projecting tube 2204. As such, when the step 2302 is positioned on the cylindrical projecting tube 2204 it may be tightly fit such that it does not shift position.

As shown in FIGS. 22-23, an oil filter may include an interface between an oil filter element and an oil filter mount. In one example, a first oil filter mount may include an outwardly projecting step. In another example, a second oil filter mount may not include an outwardly projecting step. A first oil filter element may be adapted to be fittable over the outwardly projecting step of the first oil filter mount and fittable on the second oil filter mount without the outwardly projecting step. As described further below, the first oil filter element may have an opening adapted to sealably engage with a base of the first oil filter mount and a base of the second oil filter mount.

Figure 24:
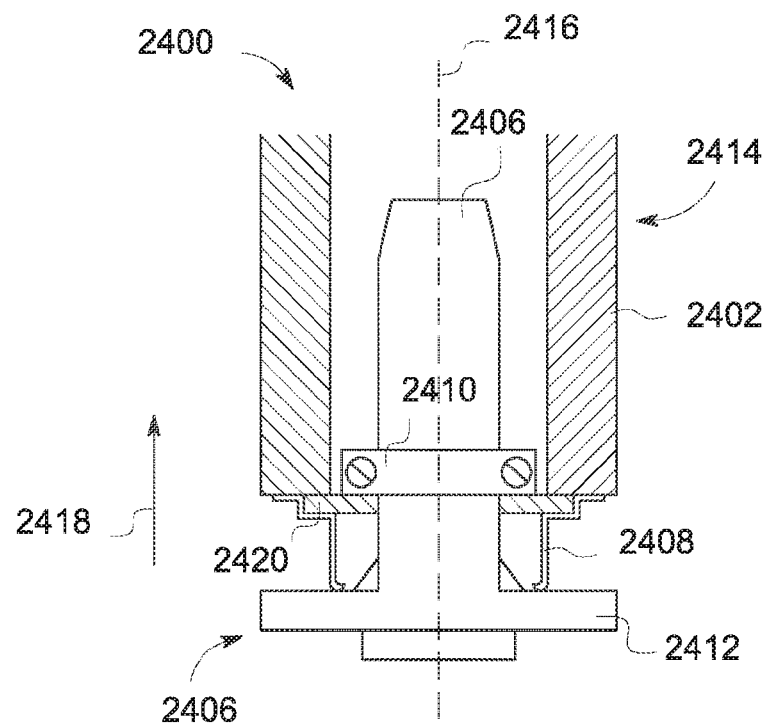
FIGS. 24-27 show schematics of an oil filter interface according to embodiments of the invention.

FIG. 24 shows a schematic of an oil filter interface 2400 comprising the second oil filter mount without the step. The oil filter interface 2400 includes an interface between an oil filter mount 2406 and an oil filter element 2414. The oil filter mount 2406 includes a base 2412 and a cylindrical projecting tube 2404, as described above with reference to FIGS. 22-23. The oil filter element 2414 includes a filter body 2402, wherein the filter body 2402 comprises a porous material. The oil filter element 2414 further includes a neck 2408 and a ring seal 2410. The neck 2408 is centered along a horizontal axis 2416 of the oil filter element. The neck 2408 is fittable over the cylindrical projecting tube 2404 of the oil filter mount 2406. In one example, the neck 2408 may comprise a sheet metal material. Further, the neck 2408 of the oil filter element 2414 is annular with a curved base configured to contact the base 2412 of the oil filter mount 2406. The curved base may have a convex or concave curve and may curve inward and towards the cylindrical projecting tube 2404 or outward and away from the cylindrical projecting tube 2404. In another example, the neck 2408 may have a straight base without curvature. The ring seal 2410 is positioned vertically above (shown by vertical direction 2418) the neck 2408 of the oil filter element, relative to the base 2412 of the oil filter mount 2406. The ring seal 2410 is coupled to an edge 2420 of the cylindrical bore of the oil filter element 2414 and sealably engages with the cylindrical projecting tube 2404 of the oil filter mount 2406. The ring seal 2410 may prevent the oil filter element 2414 from moving in the vertical direction 2418, away from the base 2412 of the oil filter mount 2406.

As described above, the oil filter element 2414 may be a second oil filter element and the oil filter mount 2406 may be a second oil filter mount. As such, the second oil filter element may be adapted to fit over the second oil filter mount. However, the oil filter element 2414 may not be fittable over a first oil filter mount, such as the oil filter mount shown in FIG. 25.

Figure 25:
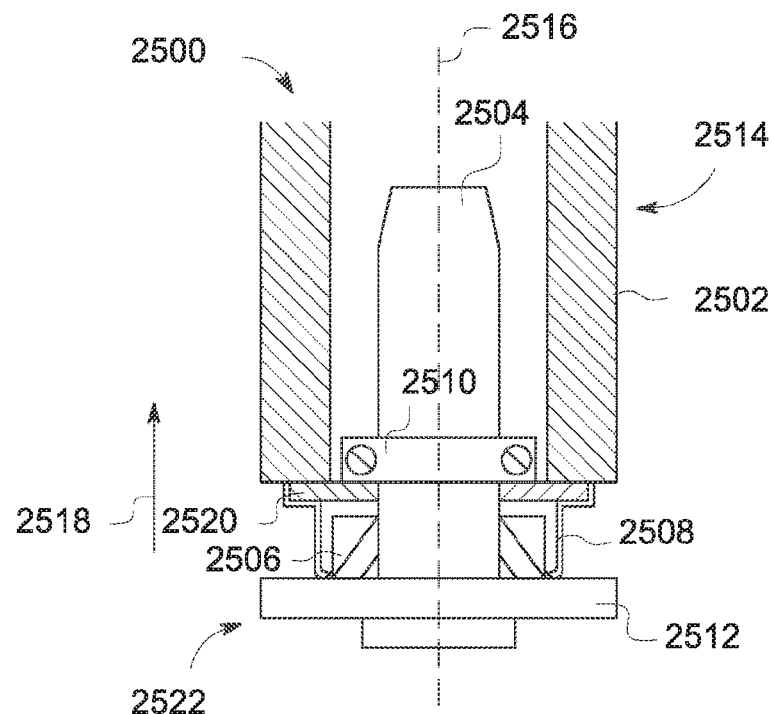

FIG. 25 shows a schematic of an oil filter interface 2500 comprising the first oil filter mount with the outwardly projecting step. The oil filter interface 2500 includes an interface between an oil filter mount 2522 and an oil filter element 2514. The oil filter mount 2522 includes a base 2512, a cylindrical projecting tube 2504, and a linearly outwardly projecting step 2506, as described above with reference to FIGS. 22-23. As described above, the step 2506 may extend around the circumference of the cylindrical projecting tube 2504. A first end of the step 2506 contacts the base 2512 of the oil filter mount 2522 at an outside edge of the step and a second end of the step contacts the cylindrical projecting tube 2504 at an inside edge of the step.

The oil filter element 2514 includes a filter body 2502, wherein the filter body 2502 comprises a porous material. The porous material may have a nominal pore size of 12 microns. In other examples, the pore size may be something smaller or larger than 12 microns. The pore size of the oil filter element 2514 is smaller than the pore size of the oil filter element 2414 shown in FIG. 24. For example, if the oil filter element 2414 is a 28 micron filter, the oil filter element 2514 may have a pore size smaller than 28 microns. In another example, the oil filter element 2514 may have an inner and outer stage with filter media of varying pore size. In this example, the oil filter element 2514 may still provide increased filtration over the oil filter element 2414. In this way, the oil filter element 2514 may entrain more oil impurities, thereby limiting abrasive wear of engine components.

The oil filter element 2514 further includes an open neck 2508 at a first end of the oil filter element 2514 and a ring seal 2510. The neck 2508 is centered along a horizontal axis 2516 of the oil filter element. As shown in FIG. 25, the open neck 2514 is wider than the linearly outwardly projecting step 2506 on the base 2512 of the oil filter mount 2522. The neck 2508 is fittable over an outer edge of the step 2506 and the cylindrical projecting tube 2504 of the oil filter mount 2522. In one example, the neck 2508 may comprise a sheet metal material. Further, the neck 2508 of the oil filter element 2514 is annular with a curved base configured to contact the base 2512 of the oil filter mount 2522. The curved base may have a convex or concave curve and may curve inward and towards the cylindrical projecting tube 2504 or outward and away from the cylindrical projecting tube 2504. In another example, the neck 2508 may have a straight base without curvature. The ring seal 2510 is positioned vertically above (shown by vertical direction 2518) the neck 2508 of the oil filter element. The ring seal 2510 is coupled to an edge 2520 of the cylindrical bore of the oil filter element 2514 and sealably engages with the cylindrical projecting tube 2504 of the oil filter mount 2522. The ring seal 2510 may prevent the oil filter element 2514 from moving in the vertical direction 2518, away from the base 2512 of the oil filter mount 2522.

As described above, the oil filter element 2514 may be a first oil filter element and the oil filter mount 2522 may be a first oil filter mount. As such, the first oil filter element may be adapted to fit over the first oil filter mount, including the step 2506. The oil filter element 2514 may also be fittable over the second oil filter mount, such as the oil filter mount 2406 shown in FIG. 24.

Figure 26:
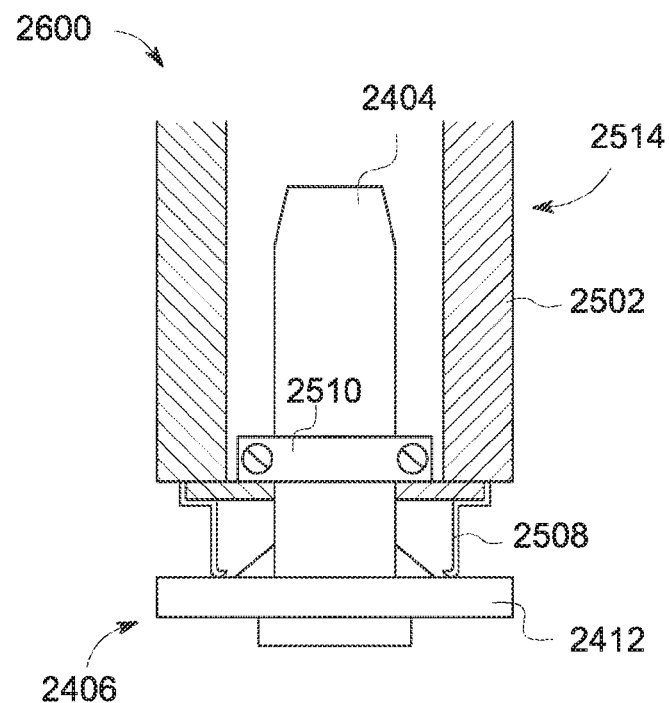

FIG. 26 shows a schematic of an oil filter interface 2600 between the second oil filter mount 2406 (presented at FIG. 24) and the first oil filter element 2514 (presented at FIG. 25). As described above, the second oil filter mount 2406 does not include a step. Thus, the wider neck 2508 of the first oil filter element 2514 fits over the cylindrical projecting tube 2404 and contacts the base 2412 of the second oil filter mount 2406. As such, the first oil filter element 2514 may be used in a group of vehicles with the first oil filter mount (such as the first group of vehicles 2002 shown in FIG. 20) and in a group of vehicles with the second oil filter mount (such as the second group of vehicles 2004 shown in FIG. 20).

Figure 27:
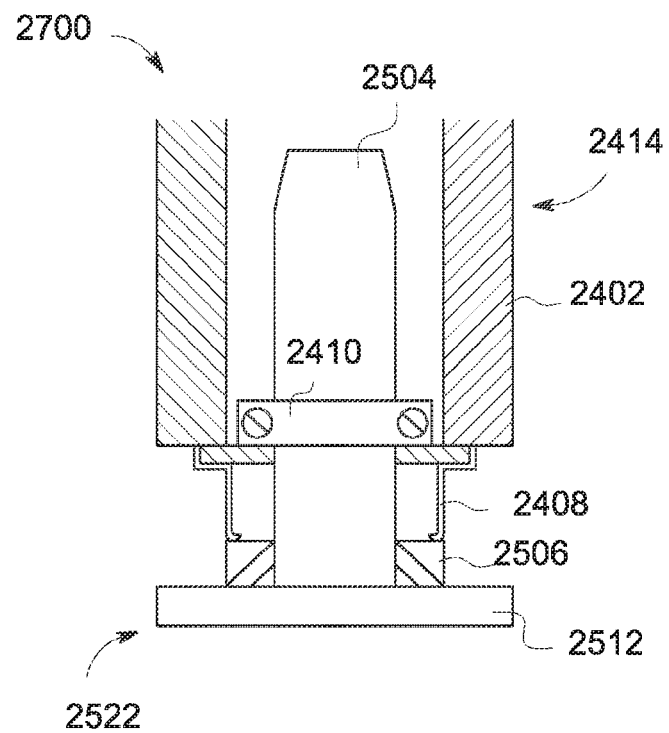

FIG. 27 shows a schematic of an oil filter interface 2700 between the first oil filter mount 2522 (presented at FIG. 25) and the second oil filter element 2414 (presented at FIG. 24). As described above, the first oil filter mount 2522 includes a step 2506. The step 2506 increases the width of which the neck 2408 or opening of the second oil filter element 2414 must fit around. The neck 2408 at a first end of the second oil filter element 2414 is narrower than the step 2506 of the first oil filter mount 2522. As a result, the neck of the second oil filter element 2414 contacts a top, outside edge of the step 2506 instead of contacting the base 2512 of the oil filter mount 2522. This may cause a second end, opposite the first end, of the second oil filter element 2414 to extend past the filter engagement surface or door of the oil filter housing. Thus, the door of the oil filter housing may not close and may not be sealable against the second end of the second oil filter element 2414, thereby causing oil to leak from the oil filter. As such, the second oil filter element 2414 may only be fittable to the second oil filter mount 2406.

Thus, the systems shown in FIGS. 19-25 provide for means for filtering engine oil; means for housing a filter body of an oil filter element; and means for engaging the oil filter element to an oil filter mount. In one example, the means for filtering engine oil may be provided by an oil filter media housed within the filter body, such as the filter body described above with respect to FIG. 25. In another example, the means for housing the filter body of the oil filter element may be provided by an oil filter housing, such as the oil filter housing described above with respect to FIGS. 21-23. Further, the means for engaging the oil filter element to the oil filter mount may be provided by a neck of the oil filter element, the neck defining an opening for engaging the oil filter mount. In one example, the neck may be wider than an outwardly projecting step and cylindrical projecting tube of the oil filter mount.

In this way, a system for an oil filter may comprise an interface between an oil filter element and a first oil filter mount. The oil filter element may have an open neck wider than a linearly outwardly projecting step on a base of the first oil filter mount. The oil filter element may comprise a porous material having a pore size based on a rated emission level of a vehicle in which the oil filter is positioned. The oil filter element may fittable over the first oil filter mount with the step, as well as fittable over a second oil filter mount without the step. As such, the oil filter element may be adaptable to fit over various oil filter mount configurations. However, other oil filter elements with an open neck narrower than the linearly outwardly projecting step on the base of the first oil filter mount may only be fittable over the second oil filter mount without the step.

Another embodiment relates to a system comprising an oil filter element and an oil filter mount. The oil filter mount comprises a base and a linearly outwardly projecting step connected to the base. The oil filter element has an open neck at a first end of the oil filter element. The open neck is wider than the linearly outwardly projecting step of the oil filter mount. The open neck of the oil filter element may be fittable over an outer edge of the step, such that the oil filter element is configured to contact the base of the oil filter mount at the first end when the oil filter element is installed for use on the oil filter mount.

In another embodiment of the system, the system further comprises an oil filter housing. The oil filter element is configured so that when installed, the oil filter element extends outwardly from the base of the oil filter mount to a filter engagement surface of the oil filter housing. The filter engagement surface may be sealable against a second end of the oil filter element.

In another embodiment of the system, the oil filter mount further comprises a cylindrical projecting tube connected to the base of the oil filter mount and extending outwardly from the base of the oil filter mount and toward the filter engagement surface of the oil filter housing. The step extends at least partially around a circumference of the cylindrical projecting tube.

In another embodiment of the system, a first end of the step contacts the base of the oil filter mount at an outside edge of the step, and a second end of the step contacts the cylindrical projecting tube at an inside edge of the step. In another embodiment, alternatively or additionally, the step is coupled to the cylindrical projecting tube. In another embodiment, alternatively or additionally, the step comprises a rubber material, and the step is tightly fit at the inside edge to the cylindrical projecting tube and at the outside edge to the base of the oil filter mount.

In another embodiment, a system comprises an oil filter mount and an oil filter element. The oil filter mount comprises a base, a tube connected to the base and projecting outwards from the base, and a step connected to the base and tube. (The tube may be cylindrical, or it may have another cross-sectional profile, such as a rectangle, oblong, oval, or the like.) A first maximum lateral dimension defined by the tube and step together is greater than a second maximum lateral dimension of the tube by itself at a location axially spaced away from the step and base. ("Lateral dimension" refers to a dimension in a direction perpendicular to a long axis of the oil filter mount, e.g., the dimension is perpendicular to 2518 in FIG. 25.) The oil filter element comprises a filter body, a seal attached to a first end of the filter body, and a neck attached to the first end of the filter body. The neck defines an opening having a third lateral dimension corresponding to the first maximum lateral dimension of the tube and step, such that the oil filter element is configured, when the oil filter element is disposed over the oil filter mount, for the neck to fit over the step and a distal end of the neck (the end of the neck opposite the filter element, which defines the limit of one end of the filter element) to abut the base. According to another aspect, the step may prevent other oil filter elements, having necks with openings sized smaller than the third lateral dimension, from fitting over the step and abutting the base. In embodiments, the step extends around the entirety of the periphery of the tube; in other embodiments, the step extends only partway around the periphery of the tube.

An embodiment for an oil filter is provided. The oil filter comprises a housing. The housing comprises a hollow cylinder having a convex curvature. Within the housing, a plurality of oil filter elements are disposed. A frame supports the housing. The frame comprises two sets of support arms, each support arm having a first, straight side facing away from the oil filter housing and a second curved side having a concave curvature in one or more regions that contact the convex curvature of the oil filter housing. The frame includes one or more mountings configured to support one or more vehicle sub-assemblies.

In an embodiment, the frame has a first set of mountings to couple to a first frame sub-assembly and a second set of mountings to couple to a second frame sub-assembly. The first frame sub-assembly is configured to couple a fuel sub-assembly to the frame, and the second frame sub-assembly is configured to couple an oil cooler sub-assembly to the frame. The frame may include a set of side support plates and a set of bottom support plates. A first side support plate may couple to a first set of the two sets of support arms, and a second side support plate may couple to a second set of the two sets of support arms. A first, front bottom support plate may couple to the first and second side support plates. A second, back bottom support plate may couple to the first and second side support plates.

In an embodiment, the frame is not, or is not part of, an engine block. In another embodiment, the frame is not part of the vehicle frame. The frame may be a separate support of the oil filter that may also be used to support other sub-assemblies.

Another embodiment relates to a system. The system comprises an oil filter comprising a housing within which are disposed a plurality of oil filter elements. The system also comprises a fuel sub-assembly and an oil cooler sub-assembly. The fuel sub-assembly comprises one or more of a fuel filter, a fuel drain tank, a fuel transfer pump, a fuel water separator, a fuel heater, a fuel drain, a fuel strainer, or a fuel vent. The oil-cooler sub-assembly comprises a brazed heat exchanger. The system further comprises a frame coupling the fuel sub-assembly and the oil cooler sub-assembly to the oil filter. In some embodiments, the frame is separate from an engine block and/or a vehicle frame.

In an embodiment, an oil filter includes an oil filter element that is adapted to be fittable over an outwardly projecting step of a first oil filter mount and fittable on a second oil filter mount without an outwardly projecting step. The oil filter element has an opening adapted to sealably engage with a base of the first oil filter mount and a base of the second oil filter mount.

In another embodiment, the oil filter element is annular shaped with a cylindrical bore centered along a horizontal axis of the oil filter element. Also, the step is linearly outwardly projecting.

In another embodiment, the oil filter element has a neck centered along the horizontal axis of the oil filter element. The neck is fittable over the linearly outwardly projecting step and a cylindrical projecting tube of the first oil filter mount.

In another embodiment, the neck of the oil filter element comprises a sheet metal material.

In another embodiment, the neck of the oil filter element is annular with a base configured to contact he base of the first oil filter mount and the base of the second oil filter mount.

In another embodiment, the oil filter further includes a ring seal, positioned vertically above the neck of the oil filter element, and coupled to an edge of the cylindrical bore and sealably engaged with the cylindrical projecting tube of the first oil filter mount.

In another embodiment, the oil filter element comprises a porous material having a pore size of 12 microns.

In another embodiment, the porous material is one or more of a cellulose media or a fibrous media.

In another embodiment, the oil filter element s adaptable to extend from the base of the first oil filter mount or the second oil filter mount to a filter engagement surface of an oil filter housing.

In another embodiment, a system includes an interface between an oil filter element and an oil filter mount. The oil filter element has an open neck at a first end. The open neck is wider than a linearly outwardly projecting step on a base of the oil filter mount.

In another embodiment of the system, the open neck of the oil filter element is fittable over an outer edge of the step and contacts the base of the oil filter mount at the first end.

In another embodiment of the system, the oil filter element extends outwardly from the base of the oil filter mount to a filter engagement surface of an oil filter housing.

In another embodiment of the system, the filter engagement surface is sealable against a second end of the oil filter element, and wherein the step comprises a spacer.

In another embodiment of the system, the step extends around a circumference of a cylindrical projecting tube. The cylindrical projecting tube extends outwardly from the base of the oil filter mount and toward the filter engagement surface of the oil filter housing.

In another embodiment of the system, a first end of the step contacts the base of the oil filter mount at an outside edge of the step and a second end of the step contacts the cylindrical projecting tube at an inside edge of the step.

In another embodiment of the system, the step is coupled to the cylindrical projecting tube.

In another embodiment of the system, the step comprises a rubber material. The step tightly fits at the inside edge to the cylindrical projecting tube and at the outside edge to the base of the oil filter mount.

Another embodiment relates to a fleet of vehicles including a first group of vehicles with a first rated engine emissions level and a first oil filter interface, a second group of vehicles with a higher, second rated engine emissions level and a second oil filter interface, wherein the second oil filter interface is different than the first oil filter interface, and a first oil filter with a first pore size. The first oil filter is fittable to both the first oil filter interface and the second oil filter interface.

In another embodiment of the fleet of vehicles, the fleet further includes a second oil filter with a second, larger pore size. The second oil filter is only fittable to the second oil filter interface.

In another embodiment of the fleet of vehicles, the first oil filter interface has a first oil filter mount with a linearly outwardly projecting step surrounding a first cylindrical projecting tube and the second oil filter interface has a second oil filter mount with a second cylindrical projecting tube.

In another embodiment of the fleet of vehicles, a neck of the first oil filter is wider than the first oil filter mount and the second oil filter mount.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle comprising:
   an engine; and
   an oil filter system, comprising: a housing comprising a hollow cylinder having a convex curvature and which is configured to receive a plurality of oil filter elements disposed therein; and a frame supporting the housing, the frame comprising a first set of support arms and a second set of support arms, each support arm having a first, straight side facing away from the housing and a second, curved side having a concave curvature in one or more regions that contact the convex curvature of the housing, and
   the straight side of each support arm of the first set of support arms being located in a same first plane, and the straight side of each support arm of the second set of support arms being located in a same second plane, each straight side of each support arm further comprising one or more mountings configured to support one or more sub-assemblies of the vehicle,
   wherein the engine is operably coupled to the oil filter system and the oil filter system is configured to filter engine oil of the engine.

2. The vehicle of claim 1, wherein the one or more mountings of the straight sides of the support arms of the first set of support arms couple the frame to a first frame sub-assembly supporting a first sub-assembly of the vehicle and the one or more mountings of the straight sides of the support arms of the second set of support arms couple the frame to a second frame sub-assembly supporting a second sub-assembly of the vehicle.

3. The vehicle of claim 1, wherein the first plane of the first set of support arms and the second plane of the second set of support arms are parallel to and spaced apart from one another, and wherein the curved sides of the first set of support arms face the curved sides of the second set of support arms, with the housing being disposed between the first set of support arms and the second set of support arms and a first side of the housing abutting the curved sides of the first set of support arms and an opposite, second side of the housing abutting the curved sides of the second set of support arms.

4. An oil filter, comprising:
   an oil filter element adapted to be:
   fittable over an outwardly projecting step of a first oil filter mount; and
   fittable on a second oil filter mount without an outwardly projecting step, the oil filter element having an opening adapted to sealably engage with a base of the first oil filter mount and a base of the second oil filter mount.

5. The oil filter of claim 4, wherein the oil filter element is annular shaped with a cylindrical bore centered along a horizontal axis of the oil filter element, and wherein the step is linearly outwardly projecting.

6. The oil filter of claim 5, wherein the oil filter element has a neck centered along the horizontal axis of the oil filter element, the neck fittable over the linearly outwardly projecting step and a cylindrical projecting tube of the first oil filter mount.

7. The oil filter of claim 6, wherein the neck of the oil filter element comprises a sheet metal material.

8. The oil filter of claim 6, wherein the neck of the oil filter element is annular with a base configured to contact the base of the first oil filter mount and the base of the second oil filter mount.

9. The oil filter of claim 6, further comprising a ring seal, positioned vertically above the neck of the oil filter element, and coupled to an edge of the cylindrical bore and sealably engaged with the cylindrical projecting tube of the first oil filter mount.

10. The oil filter of claim 4, wherein the oil filter element comprises a porous material, the porous material having a pore size of 12 microns.

11. The oil filter of claim 10, wherein the porous material is one or more of a cellulose media or a fibrous media.

12. The oil filter of claim 4, wherein the oil filter element is adaptable to extend from the base of the first oil filter mount or the second oil filter mount to a filter engagement surface of an oil filter housing.

* * * * *